March 22, 1955    J. M. ST. JOHN ET AL    2,704,614
MATERIAL HANDLING APPARATUS
Filed June 8, 1949    10 Sheets-Sheet 1
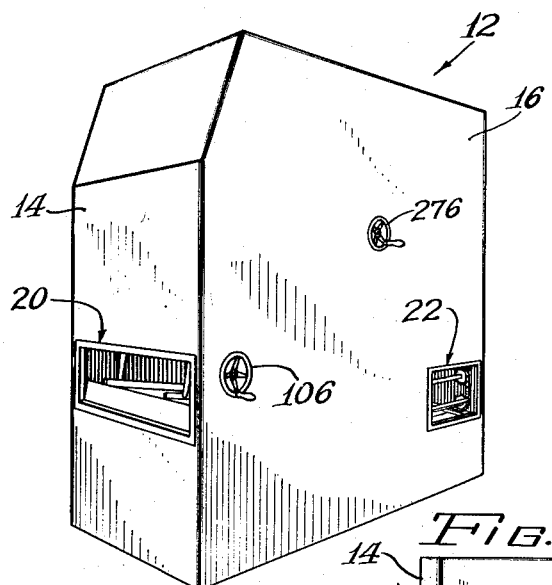
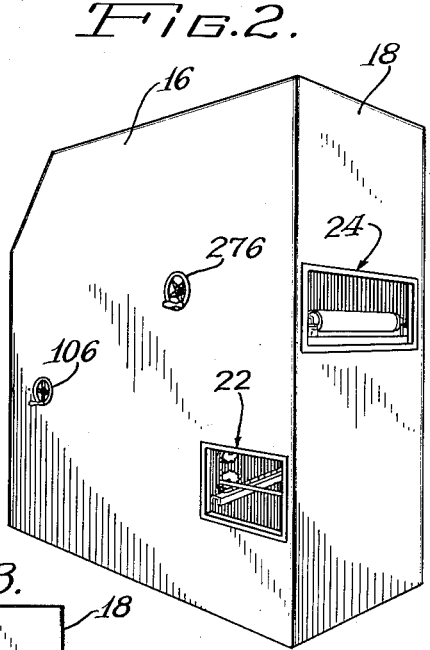
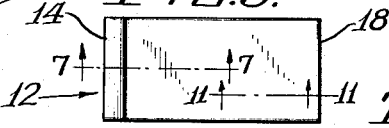
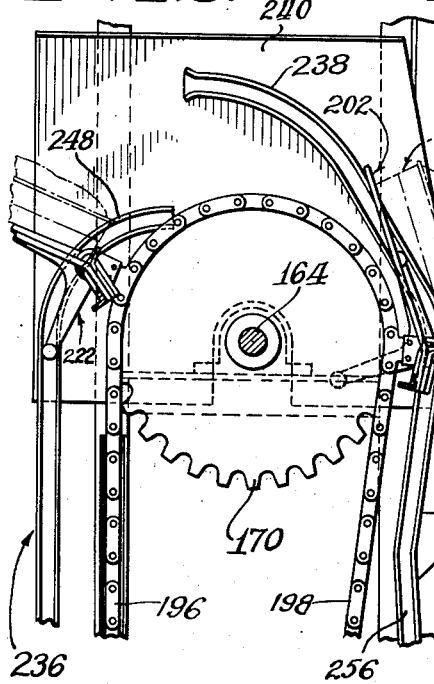
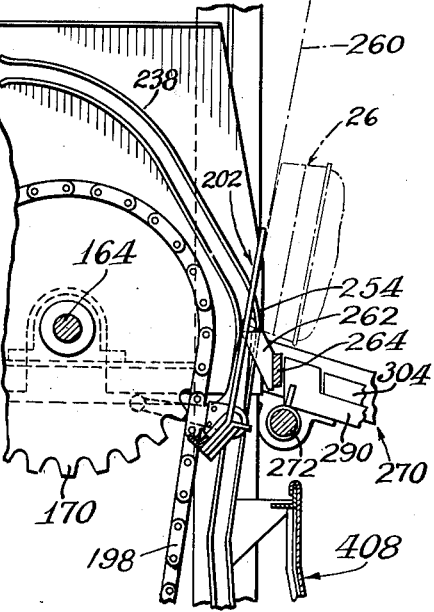
INVENTORS:
John M. St. John
Wallace W. Wittenberger
By Bair & Freeman Attys.

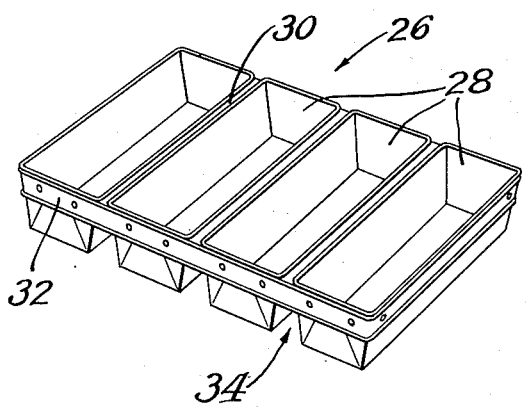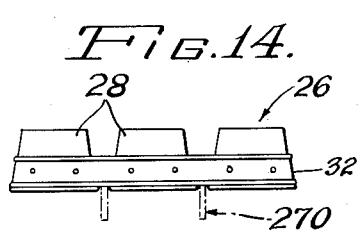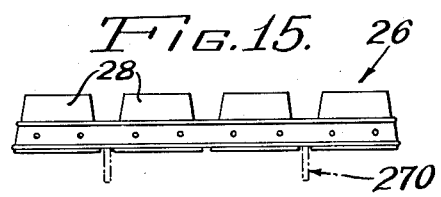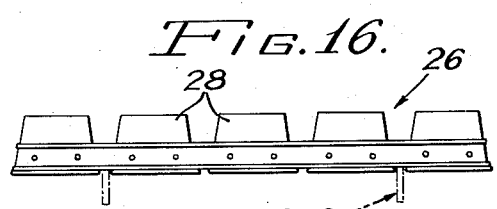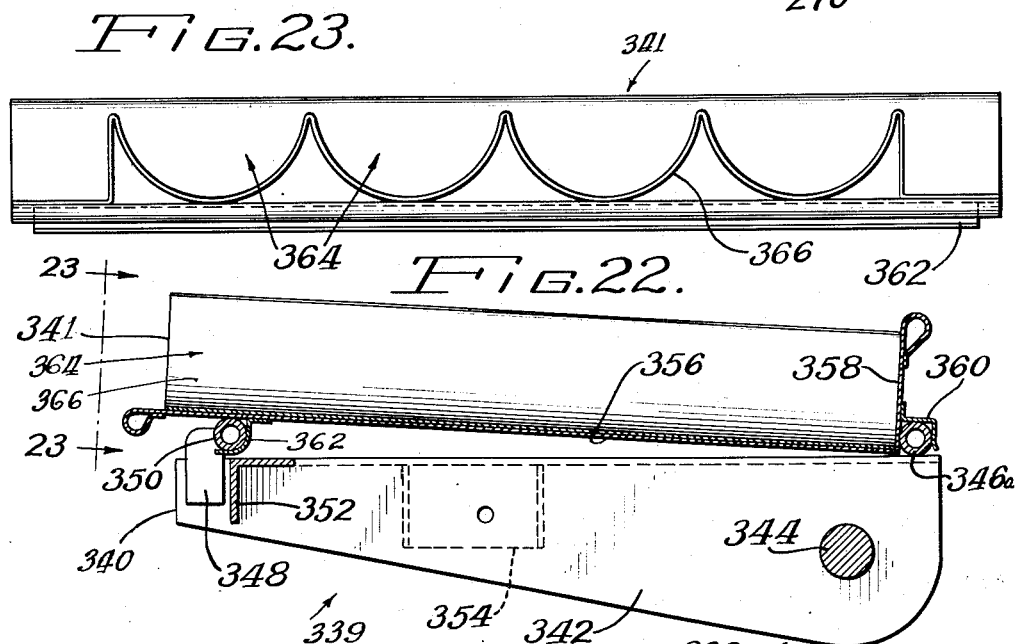

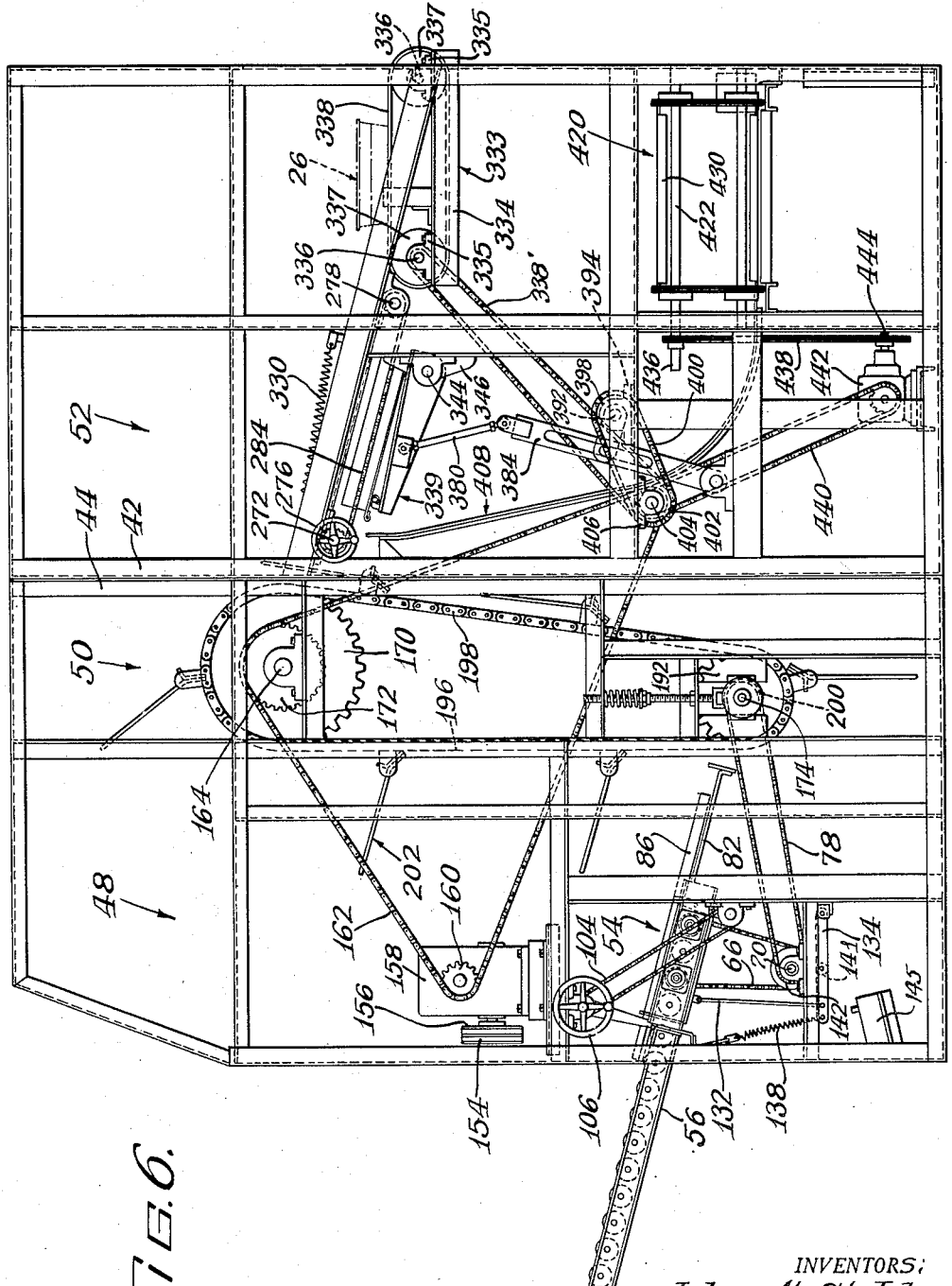

March 22, 1955 J. M. ST. JOHN ET AL 2,704,614
MATERIAL HANDLING APPARATUS
Filed June 8, 1949 10 Sheets-Sheet 5
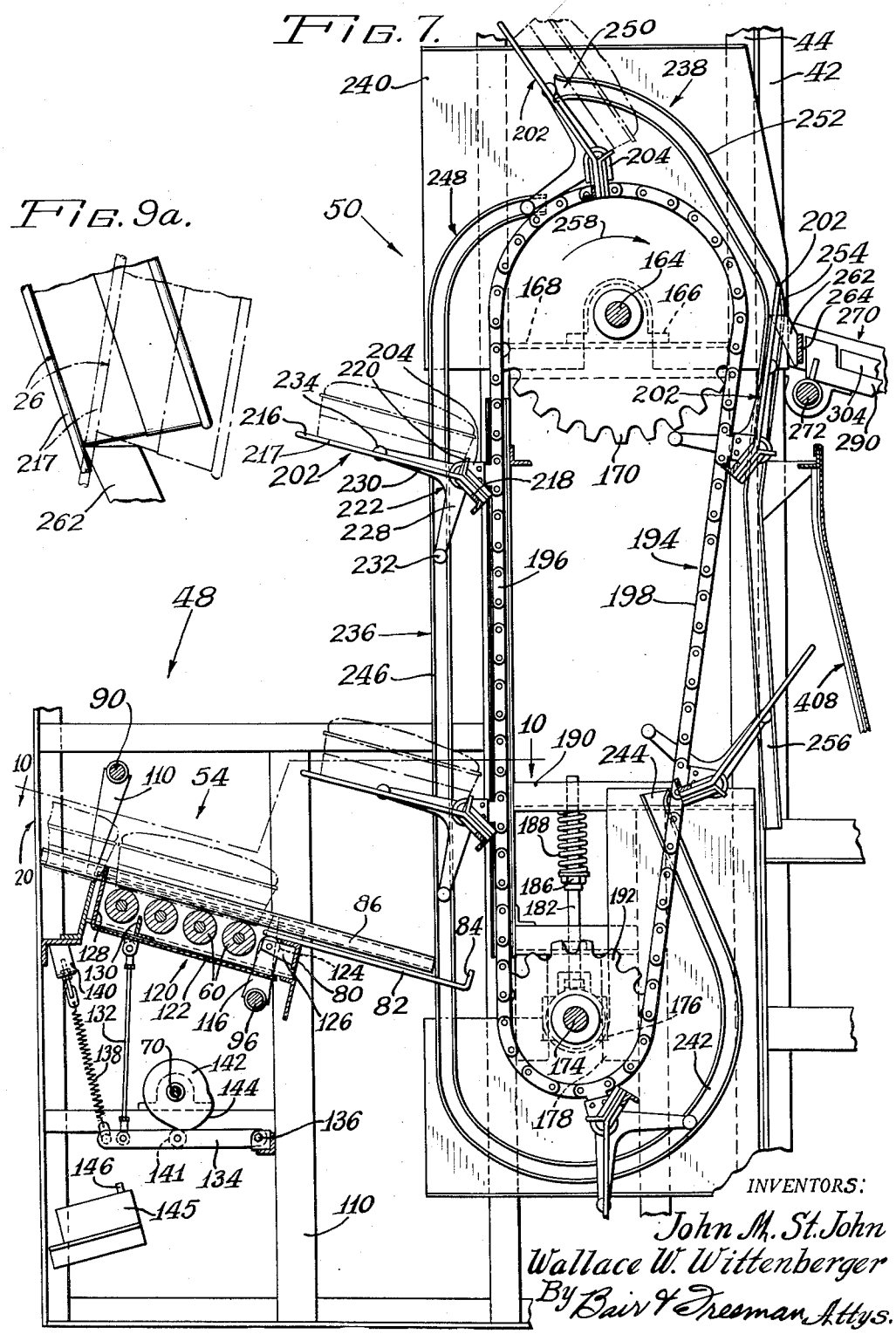
INVENTORS:
John M. St. John
Wallace W. Wittenberger
By Bair & Freeman Attys.

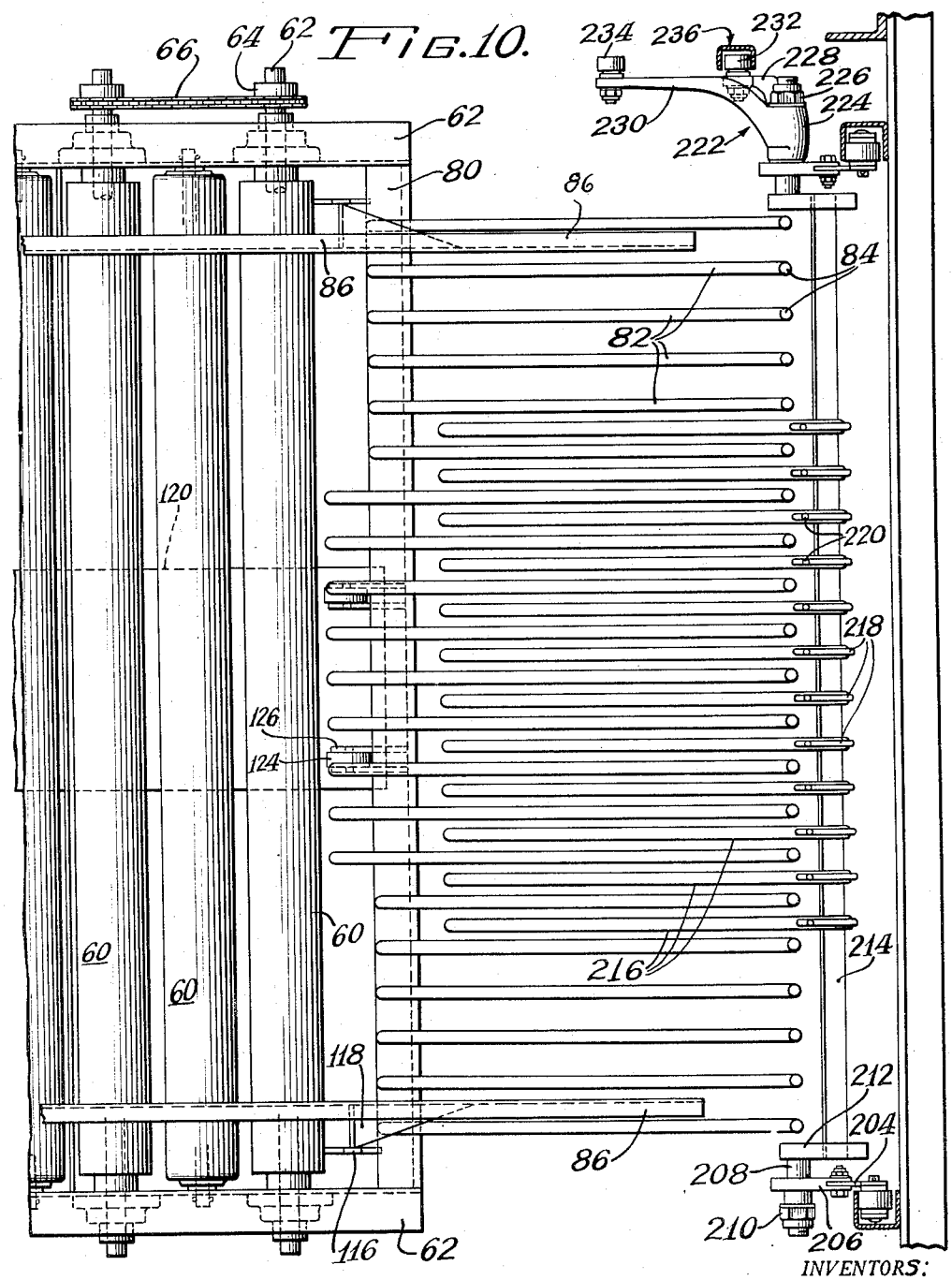

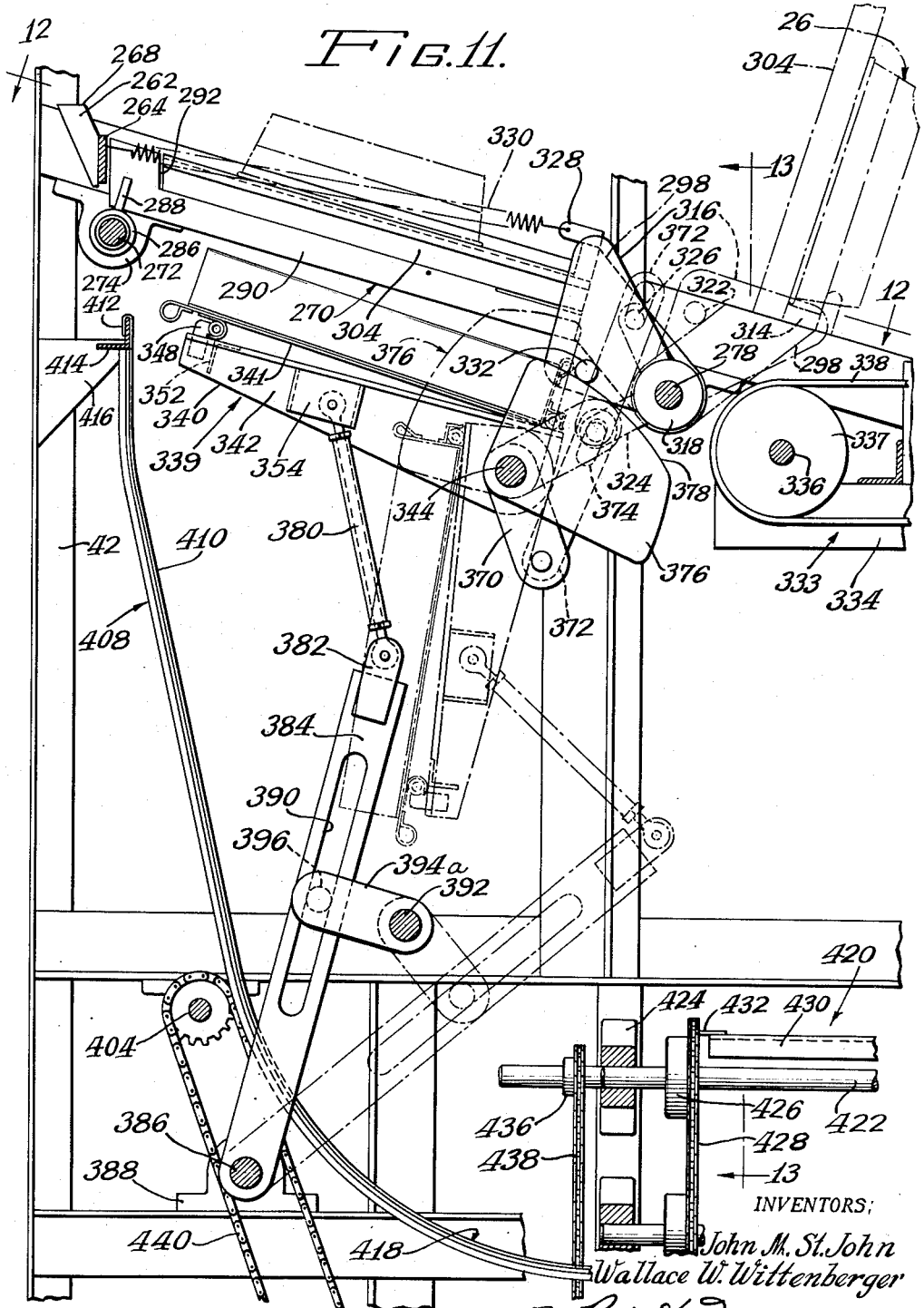

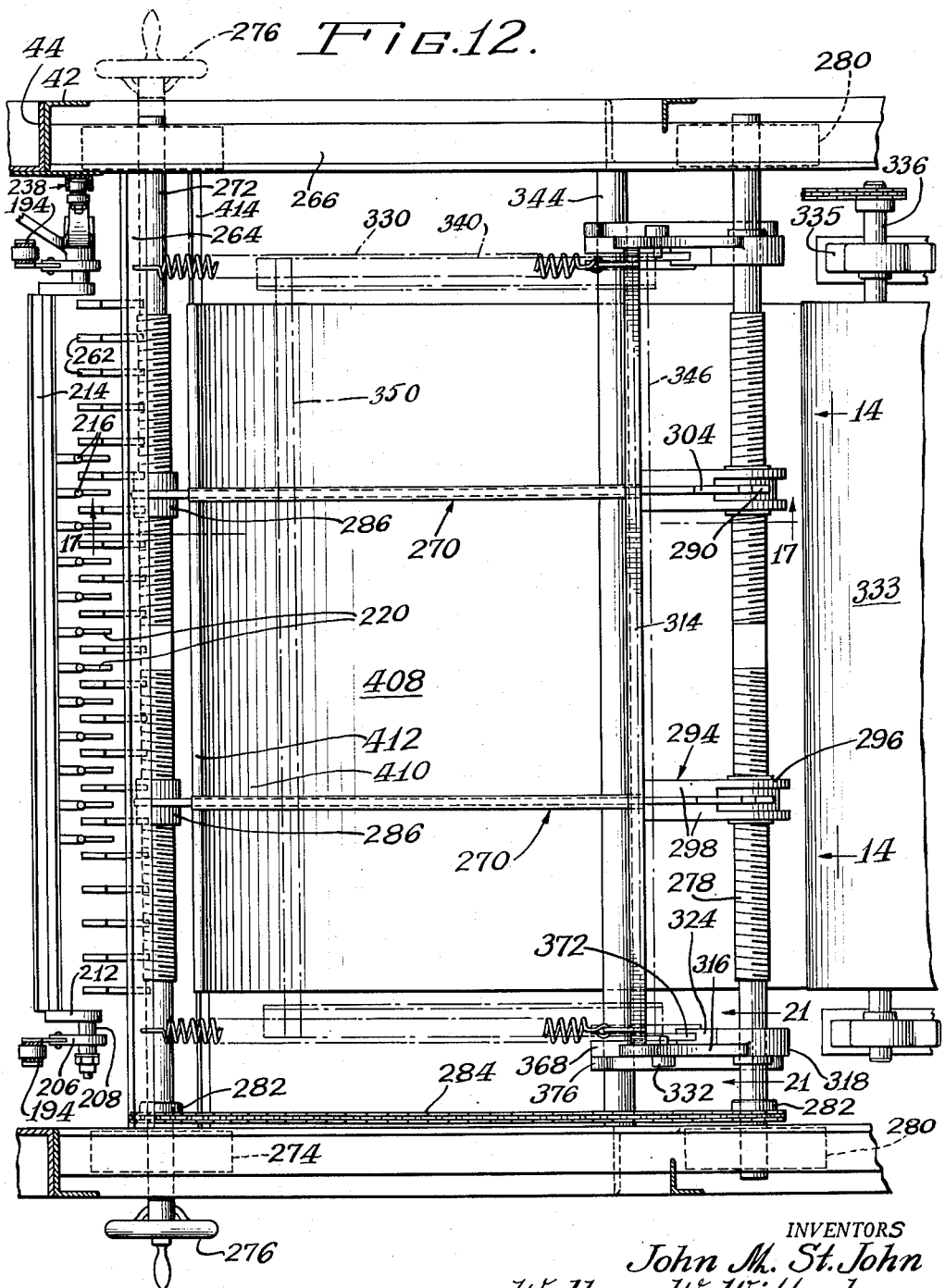

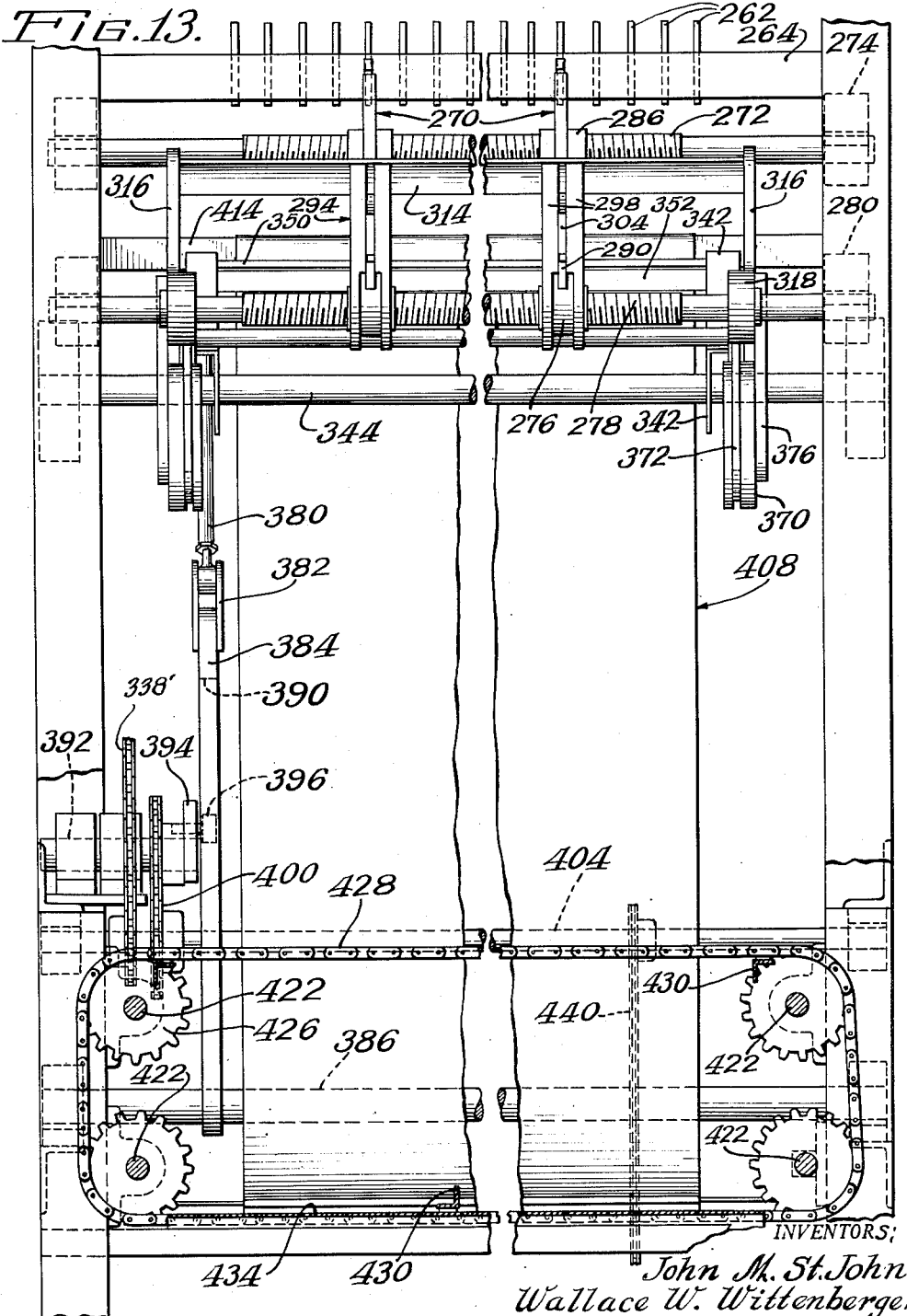

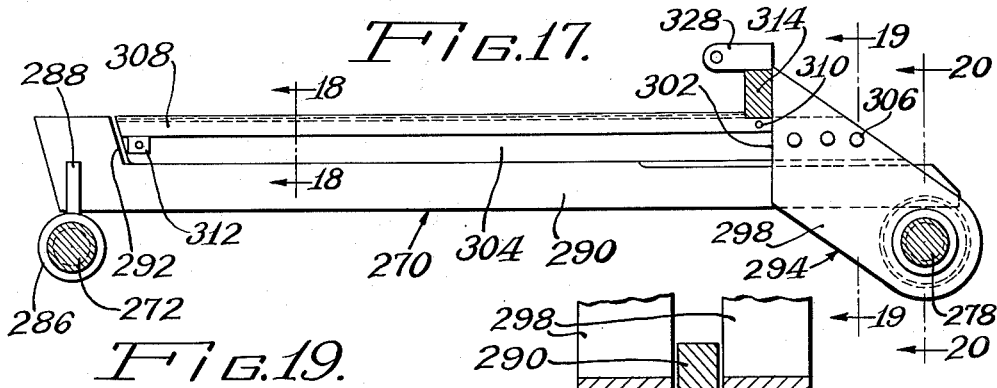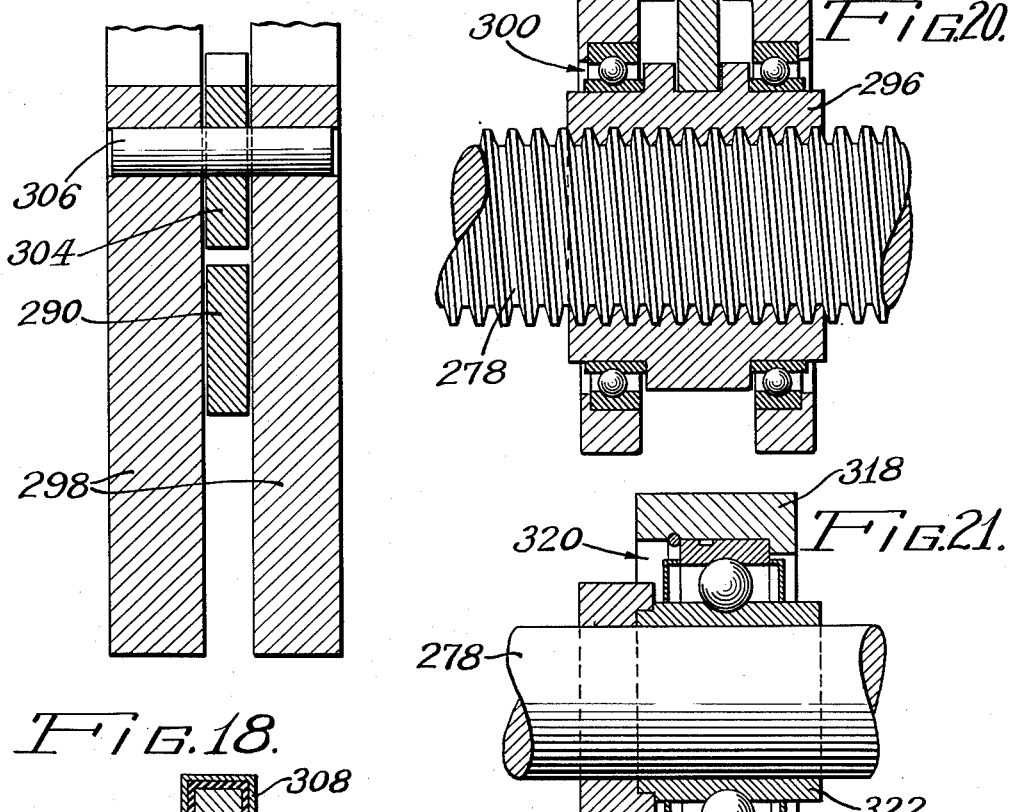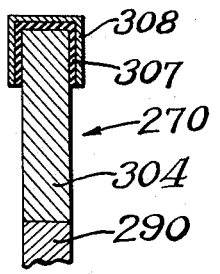

United States Patent Office 2,704,614
Patented Mar. 22, 1955

2,704,614

MATERIAL HANDLING APPARATUS

John M. St. John, Merriam, and Wallace W. Wittenberger, Marysville, Kans., assignors to The Peterson Oven Company, Chicago, Ill., a corporation of Illinois Application June 8, 1949, Serial No. 97,850

18 Claims. (Cl. 214—308)

This invention relates to material handling apparatus, and is especially adapted for use, in connection with bakeries, for depanning baked bread, that is emptying pans of bread after baking.

Formerly, and in the absence of depanning machines, the procedure in emptying pans of baked bread consisted of manual manipulation of the pans, turning the pans over, and rapping them against a fixture or object and thereby jarring the bread loaves loose from the pans.

The formal procedure was accompanied by a number of disadvantages, the most serious of which was that the operators were subjected to intense heat because the pans were emptied immediately after leaving the baking oven and the operators therefore worked close to the oven; moreover, the pans themselves were hot, resulting in further discomfort to the operators. Another disadvantage was that the loaded pans are heavy, and manually emptying them is a tiring occupation. Still another disadvantage was that because the pans were emptied manually, the loaves of bread fell in upside down position or on the side or end, and an additional operation was required to right the loaves.

Furthermore, such manual operation results in substantial crippling or damage to the freshly baked bread, resulting in monetary loss to the bakery, and also pan straps become damaged and must be replaced, and sometimes are deformed so that upon subsequent use the loaf of bread cannot be properly removed therefrom.

Heretofore, as far as can be determined, there has been no depanning machine that has been found practical and satisfactory in commercial use. A number of depanning machines have been devised, and some have been used for a time in commercial establishments, but none have been considered commercially successful.

An object of the present invention is the provision of a depanning machine by the use of which the above noted disadvantages are effectively overcome.

Another object is the provision of a bread depanning machine adapted for receiving the loaded bread pans directly from the baking oven, and thereafter automatically emptying them and delivering the empty pans and the loaves of bread to separate delivery stations.

Still another object is the provision of a depanning machine which is capable of continuous operation, and therefore its capacity for emptying pans is greatly increased.

A further object is the provision of a depanning machine adapted to receive and handle loaded pans from a baking oven as they are delivered from the oven, i. e., the pans need not be spaced apart any predetermined distance in their approach to the depanning machine.

Another object is the provision of a depanning machine having means for admitting pans into the machine in properly timed relation with respect to the operation of the machine, without the necessity of pre-spacing the pans in their approach to the machine.

Another object is the provision of a depanning machine adapted for handling pans of different sizes.

A further object is the provision of a depanning machine having a conveyor or elevator of novel construction, for raising the loaded pans from the entrance of the machine to the discharging location.

A still further object of the invention is the provision of a depanning machine in which the loaded pans are positively and forcibly moved into inverted position for emptying them, by power actuated means.

A further object is the provision of a depanning machine in which the loaves of bread after being emptied from the pans, are turned into upright position for delivery from the machine.

Another object is the provision of a depanning machine in which the pans, after being emptied, are positively and forcibly re-inverted to upright position for delivery from the machine.

Still another object is the provision of a novel bread catcher for receiving the loaves of bread after they are emptied from the pans in inverted position, and re-inverting the loaves into upright position.

A further object is the provision of a novel bread chute for cooperation with the bread for re-inverting the loaves into upright position after they have been received in the bread catcher in upside down position.

Another object is the provision of a novel bread catcher and means for quick-detachably mounting it in the machine, so that different sized bread catchers can be selectively mounted for accommodating pans of different sizes.

A further object is the provision of a depanning machine having a novel bread catcher which is positionable closely adjacent the place where the loaves are emptied from the pans, so that the loaves drop a minimum distance into the bread catcher with the top of the loaves in substantial contact with the catcher so as to reduce the possibility of injury to the bread to a practical minimum.

A still further object is the provision of a depanning machine having a novel conveyor with lifts thereon in which the lifts are disposed at such positions during certain portions of their travel, that a compact arrangement between the conveyor and other operating elements is attained.

Another object is the provision of a depanning machine having a plurality of operating units, and a sectional framework for mounting the units in such a manner that the framework can be separated into sections each of which has certain of the operating units therein, and when the sections are connected together, the operating units are in relative positions for cooperating as a unified whole.

With these and other objects in view, our invention consists in the construction, arrangement, and combination of the various parts of our device whereby the objects contemplated are attained, as hereinafter more fully set forth, pointed out in the claims, and illustrated in the accompanying drawings, wherein:

Figure 1 is a perspective view of the depanning machine of the present invention;

Figure 2 is a perspective view of the machine from the opposite end;

Figure 3 is a small diagrammatic plan view employed for the purpose of indicating certain sectional views;

Figure 4 is a perspective view of one of the pans commonly used in bakeries;

Figure 6 is a side view of the machine showing the driving elements and certain other parts;

Figure 7 is an enlarged sectional view taken on line 7—7 of Figure 3;

Figure 8 is a view of the upper part of Figure 7 showing the operating parts in a different position;

Figure 9 is a view similar to Figure 8 showing the operating parts in a still different position;

Figure 9a is an enlarged detail view of the fulcruming fingers illustrating the fulcruming action of a pan thereover;

Figure 10 is an enlarged view taken on line 10—10 of Figure 7;

Figure 11 is an enlarged sectional view taken on line 11—11 of Figure 3;

Figure 12 is a view taken on line 12—12 of Figure 11;

Figure 13 is a rear view taken on line 13—13 of Figure 11;

Figures 14, 15 and 16 are diagrammatic views illustrating the knock-out bars and different size baking pans;

Figure 17 is a detail view of one of the knock-out bar assemblies;

Figure 18 is a sectional view taken on line 18—18 of Figure 17;

Figure 19 is a sectional view taken on line 19—19 of Figure 17;

Figure 20 is a sectional view taken on line 20—20 of Figure 17;

Figure 21 is a sectional view taken on line 21—21 of Figure 12;

Figure 22 is an enlarged side view of the bread catcher; and

Figure 23 is a view taken from the right on line 23—23 of Figure 22, showing the bread catcher pan.

GENERAL

Figure 5:
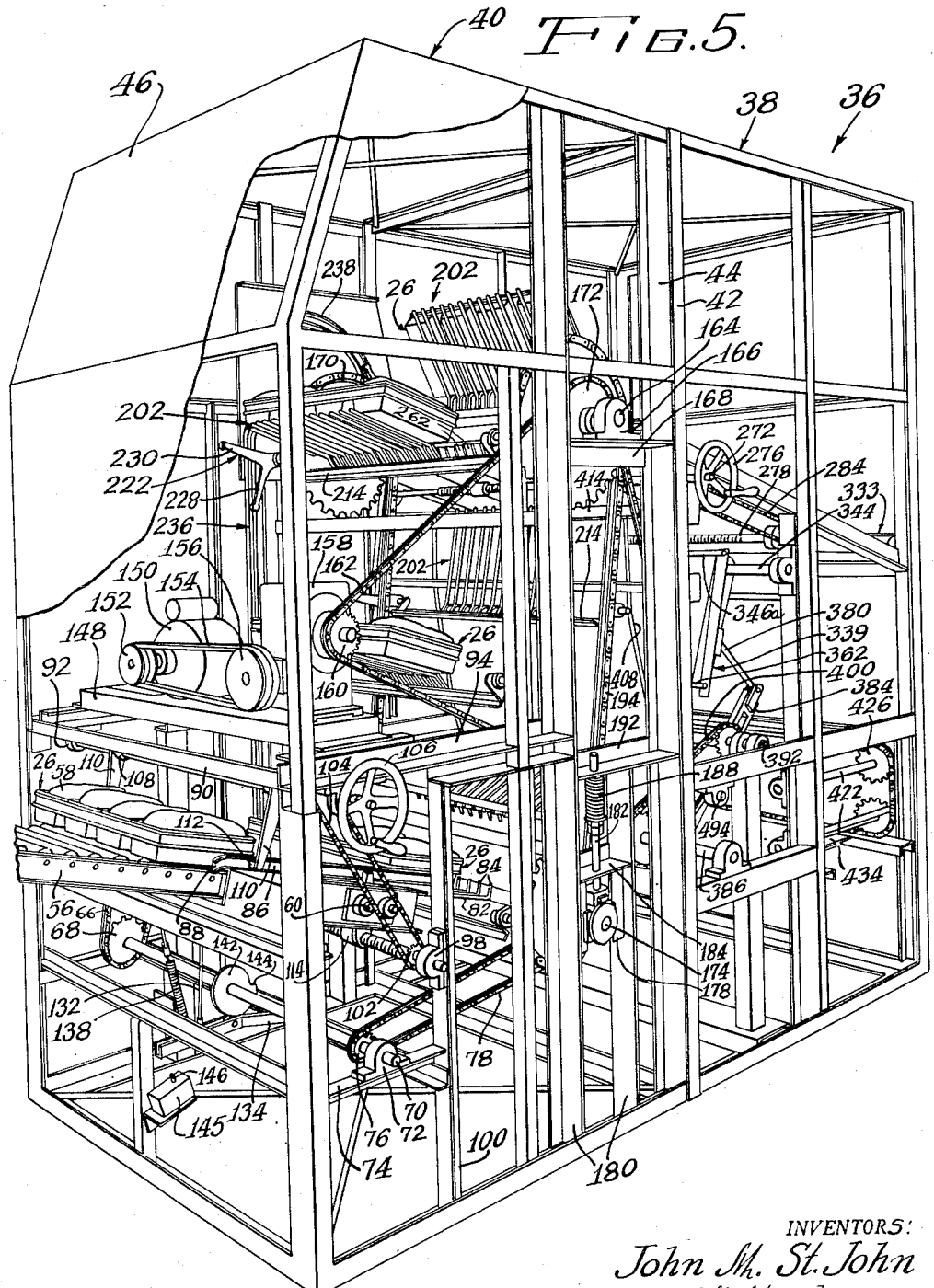
Figure 5 is an enlarged perspective view of the machine with the outer sheet metal covering removed.

Referring in detail to the drawings, Figures 1, 2 and 3 are small scale, simple views employed for the purpose of representing the device as a whole so that its general design and purpose can be readily understood. The machine as a whole is illustrated at 12 and in Figure 1 the reference numeral 14 indicates the front end and the numeral 16 indicates the right side of the machine, while in Figure 2 the numeral 18 indicates the rear end. The references to the front and rear of the machine occurring throughout the specification, are to be interpreted in the light of the orientation of the machine just described. At the front end of the machine is an entry opening 20 for the delivery of pans of loaves into the machine. On the right side and toward the rear is an opening 22 for the discharge of baked loaves and at the rear is an opening 24 for the discharge of the baking pans after they have been emptied.

The machine is adapted for use primarily in bakeries and is employed in conjunction with certain other machines including a baking oven, pan fillers, etc. The pans containing the baked loaves after leaving the oven, are conveyed to the entrance opening 20 by means of a conveyor. Such a conveyor may be a conventional conveyor normally employed in the bakery for conveying pans of baked loaves, and in the present instance it conveys the pans directly into the depanning machine. After the baked loaves are delivered from the opening 22 another conveyor may be employed for carrying the loaves to a wrapping machine and similarly a conveyor is employed in connection with the discharge opening 24 for carrying the empty pans to a pan filling machine.

Bread pan strap

Figure 4 illustrates one of the pan straps for containing loaves and the description thereof is introduced at this point so that the design and purpose of the machine may be more readily understood. The pan strap is indicated as a whole at 26 and comprises a plurality of pan elements 28 arranged in side by side relation with slight spaces 30 between adjacent pan elements. The pan elements are then secured together by means of a strap 32 which entirely surrounds all of the pan elements and is riveted thereto whereby the pan elements are rigidly secured together to form what is referred to in the trade as a pan strap. Each of the pan elements 28 converges downwardly whereby spaces 34 are provided between the pan elements adjacent the bottoms thereof.

The pan 26 illustrated in Figure 4 is made up of four pan elements which is one of the common sizes of pan straps employed. However, other numbers are employed at times, such as three or five. The machine in the present invention is adapted to accommodate pan straps of various sizes, i. e., those containing three, four or five pan elements, by reason of a novel adjustment means which will be referred to in detail.

FRAME STRUCTURE

The frame structure is shown best in Figures 5 and 6 and is indicated as a whole by the numeral 36. The frame structure is made up of structural members of various sizes and shapes, which may be channels, angles, etc. and contains various elements at particular locations for supporting the operating parts. Such individual structural members will not be referred to at the present but will be pointed out in connection with the particular operating parts. The frame structure 36 comprises two main sections 38 and 40 which are detachably secured together. Included in the structure of the sections is an angle member 42 on the section 38 and an angle member 44 on the section 40 which are in abutting relation and are secured together by means of bolts. The machine may be separated at this point for shipment into separate sections or units. The only elements interconnecting the operating parts of the two sections is a drive chain which can of course be readily removed.

The frame structure 36, and therefore the whole machine, is covered by a sheet metal skin or covering 46 which may be in the form of separate panels conveniently secured in place. The skin or covering 46 is provided with appropriate openings for providing for the entrance opening 20 and the exit openings 22 and 24 referred to above.

The machine will be described as being made up of three units each of which is an operating unit, and the description thus broken down will be more readily understood. Reference is directed to Figure 6 showing the machine from the side, wherein the three sections are indicated as follows: The loading section indicated at 48, the lift section at 50 and the discharging section at 52.

LOADING SECTION

Loading platform

A loading platform is indicated in its entirety by the numeral 54 and is disposed immediately inside the entrance opening 20 of the machine. The platform 54 slopes downwardly and inwardly of the opening and forms an extension of a conveyor 56 (Figure 6) which is preferably the one leading from the baking oven as referred to above. The conveyor 56 may be gravity controlled or it may be a powered conveyor for conveying the pans into the machine. Figure 5 illustrates one of the pan straps 26 on the conveyor 56 filled with loaves 58 in position approaching the loading platform 54.

Platform rollers

The upper outer portion of the loading platform 54 comprises a plurality of transversely extending rollers 60 journalled in frame elements 62 on opposite sides of the machine. Certain of the rollers 60 are power driven by means of extensions 62 of their shafts extending out through the frame element 62 and provided with sprockets 64 over which is trained a chain 66. The chain 66 is also trained over a sprocket 68 secured to a shaft 70 which is journalled in bearing 72 mounted on structural frame elements 74. The chain 66 is trained over sprockets 64 on two of the rollers in the present instance, but the particular number of rollers which are power driven is not an essential of the present invention and a greater or lesser number of rollers may be powered if desired. The shaft 70 is also provided with another sprocket 76 over which is trained a chain 78 from which the shaft derives its power. The rollers 60 are disposed in an inclined plane and in the plane of the whole support platform 54.

Pan supporting portion of platform

Rearwardly of the rear roller 60 is a transverse angle member 80 secured to the frame elements 62 and disposed so that one of its flanges is uppermost, extending in substantially the direction assumed by the platform. Secured to the angle member 80 is a plurality of rods 82 which extend rearwardly and downwardly from the angle member. The rods 82 are parallel and transversely spaced apart forming a supporting surface for the pans. The inner ends of the rods 82 have upturned portions 84 forming a stop for preventing the pans from sliding off the inner end of the platform. The rods 82 may be welded to the angle iron 80 or secured thereto by any other means. The upper surface of the rods 82 forms a substantial continuation of the plane determined by the upper surfaces of the roller 60, i. e., it slopes downwardly and inwardly. However, in practice the rods 82 may be lowered slightly with respect to the rollers so that when the pans roll down the rollers they will readily slide onto the rods.

Guide rails for pans

A pair of guide rails 86 is provided for guiding and centering the pans on the platform on entering the machine. The guide rails 86 are disposed parallel with respect to each other and extend inwardly from the opening 20. Figure 10 illustrates the guide rails adjacent the sides of the platform 54 and they may assume this position for guiding pans of greater width. The guide rails are movable laterally toward and from each other for engaging and guiding pans of lesser widths. Each of the guide rails 86 in the present instance is preferably channel shaped in cross section although other shapes may be employed. The web or closed side of the guide rail is disposed inwardly for purposes of inserting supporting members into the opposite sides of the channels from the outside. The outer ends of the guide rails 86 are flared outwardly, or diverge with respect to each other, as indicated at 88 (Figure 5) for more readily guiding the pans into proper position between the main portions of the guide rails. In practice, separate extensions of the flared portions 88 may be employed outwardly of the oven along the conveyor 56 for providing a more gradual guiding effect on the pans.

The guide rails 88 as illustrated in Figures 5 and 7 are disposed slightly above the platform 54 and are of course inclined at the same angle as the platform. The height of the guide rails is such that they preferably remain below the strap 32 of the pan strap so that they engage only the pan elements themselves.

The means for moving the guide rails 86 toward and from each other include a shaft 90 rotatably mounted in bearings 92 which in turn are mounted on structural elements 94, and a second shaft 96 disposed rearwardly of the shaft 90, rotatably mounted in bearings 98 which are supported by frame elements 100.

The shafts 90 and 96 are provided with sprockets 102 over which is trained a chain 104 for rotation of both of the shafts together when one is rotated. The shaft 90 is provided with a hand wheel 106 disposed outwardly of the sheet metal covering of the machine for ready manipulation by the operator.

Each of the shafts 90 and 96 has portions provided with oppositely directed threads. Mounted on these threaded portions in the case of the shaft 90 are threaded bearing sleeves 108 on which are rigidly secured arms 110 extending downwardly and at their lower ends are provided with inturned lugs 112 inserted into the channels forming the guide rails 86; the lugs 112 are welded rigidly to the guide rails.

Similarly the rear shaft 96 is provided with bearing sleeves 114 which are threaded on the shaft and secured to the sleeves 114 are upstanding arms 116 the upper ends of which are provided with inturned lugs 118 (Figure 10) inserted in the channels forming the guide rails. In this case also the lugs 118 are welded to the guide rails.

On rotation of the shaft 90 by manipulation of the hand wheel 106, the other shaft 96 is also rotated in a like direction and the arms 110 and 116 are moved inwardly or outwardly depending on the direction of rotation of the shafts, and consequently the guide rails 86 are moved laterally toward or from each other. If desired, the guide rails 86 may be provided with an appropriate gauge for indicating their positions.

The pan straps enter the machine in the position indicated in Figure 5, i. e., the individual pan elements 28 are disposed side by side transversely of the machine and this direction will be referred to as the width of the pans, although this dimension is greater than the other dimension which will be referred to as the length. These references are employed for purposes of more readily identifying the positions and movement of the pan straps through the machine.

As the pan strap slides down the roller 60 and rods 82, their sides are engaged by the guide rails 86 which have been equally spaced from and are positioned on opposite sides of the center of the machine, so that the pan strap itself is centered with respect to the platform 54 and with respect to the machine.

The length of the rods 82 is such as to be at least as long as the length of the pans so that when the pans are resting thereon they do not project over the transverse angle member 80 or over the rollers.

Pan trip mechanism

The trip mechanism is indicated as a whole at 120 and includes a platelike member 122 which is mounted to operate as a lever. The plate element 122 is mounted below the rollers 60 and is of a width considerably less than the platform 54 as indicated in Figure 10. Adjacent the rear end of the plate element 22 are upstanding lugs 124 which are pivoted in ears or projections 126 mounted on the transverse angle member 80 so that the plate element 122 can be pivoted about a horizontal axis. Adjacent the front of the plate element 122 is an upstanding stop element 128 adapted to extend upwardly in front of the front roller 60 to a position above the upper surface of the platform. A transverse member 130 is mounted on the frame elements 62 above the plate element 122 forming a stop means for limiting the upward movement of the plate 122 when it engages the member 130.

Pivoted to the underside of the plate 122 is a link 132 the lower end of which is pivoted in the swinging end of a lever arm 134 pivoted at 136 in a bracket supported by one of the frame elements such as 100. Also secured to the outer swinging end of the lever arm 134 is a tension spring 138, the other end of the spring being secured to a bracket 140 which is mounted on one of the frame elements. The spring 138 biases the lever arm 134 to raised position, and normally retains it in such position.

Pivotally mounted in the lever 134 is a cam follower roller 141 which is engageable by a rotatable cam 142 mounted on the shaft 70. The cam 142 is provided with a single lobe 144 which engages the cam follower roller 140 on rotation of the cam. Normally the spring 138 retains the lever arm 134 in raised position which retains the plate 122 in raised position, and the stop element 128 above the upper surface of the platform 54, and when the lobe 144 of the cam engages the cam follower 140, it depresses the lever 134 which retracts the plate 122 downwardly and draws the stop element 128 downwardly below the top surface of the platform.

When the stop element 128 is above the top surface of the platform, and pans are delivered or conveyed to the depanning machine, they are prevented from moving onto the platform 54 by the stop element. The pans then pile up on the conveyor 56, i. e., they rest one against the other in abutting relation. When the stop element 128 is retracted, the lowermost pan is permitted to move onto the platform, and the remaining pans also move down the conveyor. Before the lowermost pan has moved completely across the stop element, the latter is permitted to be biased upwardly by the spring 138. The stop element then engages the pan, but does not deter its movement. It will be remembered that the pans converge downwardly so that when the pans are in abutting engagement on the conveyor, the engagement is effected between the straps, and the lower ends of the pan elements are spaced from one pan to the next, and while the pans are thus in abutting relationship the stop element 128 is nevertheless permitted to enter into the spaces between adjacent pans. When the lowermost pan has passed completely over the stop element, the stop element is then raised so that it enters into the space between that pan and the next one above it, and stops the movement of all of the succeeding pans. Thus, one pan at a time is permitted to slide down the platform 54 and that particular pan is carried away by the conveyor means before the next one is permitted to slide down the platform. The conveyor means will be described later and the means for synchronizing the drive between the various parts will also be referred to in detail.

Safety switch

Mounted on the frame structure below the lever arm 134 is a switch 145 having a depressible plunger 146. The switch 145 may be conventional and of such a construction that when the plunger 146 is depressed a wiring circuit is opened. If the spring 138 should break, the lever arm 134 will fall and engage the plunger 146, depressing the latter and opening the circuit to the drive motor. The operation of the machine would then immediately cease. A safety switch at this point is advantageous in view of the fact that if the trip element 120 should cease to operate properly and the machne is not stopped then the pans would continue sliding down the platform 54 with possible damage.

The foregoing under the main heading "Loading Section" completes the description of the construction of the loading section and we desire to point out that the mechanism thus far described does not have any positive and direct connection with any of the other operating parts of the machine with the exception of driving chains. That portion of the frame structure which supports the loading section, together with the operating parts of the loading section, may be referred to as a unit, and although it is not detachably connected with the other parts of the machine it is nevertheless localized and is comprised of a self contained mechanism.

Driving motor

Mounted above the platform 54 is a table or support 148, positioned at this location for purposes of convenience. The table 148 supports an electric motor 150 having a drive shaft and pulleys 152 which drive a belt 154 which in turn is trained over another pulley 156 on the shaft of a speed reducer 158. The speed reducer 158 is provided with a shaft and sprocket 160 over which is trained a main drive chain 162. The chain 162 drives certain opening parts of the machine which will be described as the specification proceeds. The complete machine is powered by the electric motor 150 through the chain 162 and the circuit in which the safety switch 145 is interposed is that circuit which controls the operation of the drive motor 150.

LIFT SECTION

The lift section which was formerly identified by the numeral 50 includes conveyor means for lifting the pans of loaves from the rods 82 and conveying them to a place of deposit for discharging the loaves from the pans.

Conveyor

The conveyor includes an upper rotatable shaft 164, journalled in bearings 166 mounted on frame elements 168. The shaft 164 is positioned toward the upper end of the machine and extends transversely across the machine. Adjacent each end of the shaft 164 is a sprocket 170 secured to the shaft for rotation therewith. Also secured to the shaft 164 is a smaller sprocket 172 adjacent one end thereof, which is driven by the main drive chain 162.

The conveyor also includes a lower transverse rotatable shaft 174 mounted in bearing blocks 176. The bearing blocks 176 are adapted for vertical adjustment and are supported in a channel or groove defined by plates 178 welded or otherwise secured to frame elements such as 180. The bearing blocks are provided with grooves into which the plates 178 are fitted, and being slidable on the plates, the bearing blocks are permitted a limited degree of vertical movement. Secured to the upper side of the bearing blocks are threaded bolts 182 extending through holes in other frame elements 184 and above the plate elements 184 are nuts 186 threaded on the bolts above which are mounted compression springs 188 biased between the nuts and frame elements 190, the latter having holes for projection of the pins 182 therethrough. The compression springs 188 normally bias the shaft 174 downwardly, and by adjustment of the nuts the biasing pressure can be varied.

Secured adjacent each end of the shaft 174 is a sprocket 192 for rotation with the shaft and being in alignment respectively with the upper sprockets 170. Conveyor chains 194 are trained over the aligned sprockets and the conveyor then is an endless conveyor having a front or upwardly moving run 196 and a rear or downwardly moving run 198.

The lower shaft 174 is also provided with a smaller sprocket 200 secured thereto for rotation therewith over which is trained the chain 78 previously referred to. Rotation of the shaft 174 causes actuation or driving of the chain 78 which in turn rotates the cam shaft 70.

Conveyor lifts

The conveyor is provided with a plurality of lifts 202 (Figures 5, 7 and 10). The details of construction of the lifts are best illustrated in Figures 7 and 10.

Certain of the links of the chain 194 are provided with rigid ears 204 extending outwardly therefrom in planes perpendicular to the axes of rotation of the conveyor shafts. Secured to the ears 204 as by bolting are plates 206 which form in effect extensions of the ears 204. It will be understood that both chains are provided with the ears and plates as just referred to and these elements are in transverse alignment for mounting of the lifts. Each of the plates 206 is provided with a bearing opening for supporting a stub shaft 208 for rotation therein on a transverse axis. The shafts may be mounted by any convenient securing means such as nuts 210 on one end and by cam means on the other end which will be referred to later. Each of the stub shafts 208 has secured on its inner end for rotation therewith a plate or other convenient mounting element 212 and rigidly mounted on and between the two mounting elements 212 is a transverse angle member 214. The angle member 214 may be of any desired construction appropriate for mounting of the remainder of the lifts. In the case where an angle member is employed it is disposed so that one of its flanges is in position for mounting a plurality of rods or fingers 216. Each rod 216 has a long portion and a short portion 217 at the rear thereof, or the inner end with respect to the conveyor, which is bent with respect to the outer long portion and welded directly to one of the flanges of the angle member 214. Also welded to the angle member 214 is a short rod 218 which is superimposed over the rod 216 in alignment therewith. The rod 218 is provided with a bent portion 220 which is disposed substantially at right angles to the long portion of the rod 216 and is disposed at the inner end thereof. The rods 216 therefore extend outwardly from the conveyor chains and are spaced transversely across the machine at a spacing equal to the spacing between the rods 82 in the platform 54. It is not essential that the rods 16 occupy the full transverse range of the conveyor but may be of a lesser range as clearly illustrated in Figure 10.

Mounted on one of the stub shafts 208 is a bell crank cam referred to generally as 222 which comprises a hub portion 224 and arms 228 and 230 which in the present instance are substantially at right angles to each other. The arm 228 is provided at its outer end with a cam follower roller 232 and similarly the other arm 230 is provided with a cam follower roller 234.

Cam track for conveyor lifts

The cam track for controlling the movements of the conveyor lifts is made up of two segments 236 and 238 each of which is channel shape in cross section and secured to plates such as 240 mounted on the structural framework of the machine. The segments of the cam track are mounted with the web or closed side of the channel abutted against the plates and the open side of the channel facing inwardly for engagement by the cam follower rollers 232 and 234.

The segment 236 of the cam track has a curved portion 242 at the bottom of the conveyor and an entrance open end 244. The curved portion 242 merges into a vertical straight portion 246 extending upwardly at the front of the conveyor and terminating at the top in another curved portion 248 adjacent the top of the conveyor.

Adjacent the top terminal end of the segment or curved portion 248 is the entrance portion 250 of the segment 238 from which the segment 238 curves rearwardly and downwardly, having a relatively short straight portion 252 merging into a knee portion 254 which has a relatively abrupt change of direction, and finally the segment merges into the terminal portion 256.

For purposes of illustrating the action of the lifts 202, reference may be directed to a particular lift for purposes of following through the stages or positions assumed by the lift. Using a particular one as a starting point attention is directed to that lift 202 which is disposed at the left of Figure 7 and just above the center. At this point the cam follower roller 232 on the arm 228 is in the segment 236 of the cam track and the cam track is so located that the long portion of the rods 216 are disposed outwardly from the conveyor and at an upwardly inclined angle. Movement of the conveyor is in a clockwise direction as indicated by the arrow 258 and as the lift 202 is raised, the lift changes its angle because of the peculiar curvature of the portion 248 with respect to the sprocket 170. As the lift approaches the top of the conveyor and as the cam follower roller 232 is about to leave the portion 248 the lift is inclined at a greater angle upwardly with respect to the horizontal and at this point the cam follower roller 234 enters the portion 238 of the segment of the cam track. As the conveyor continues the portion 252 of the cam track guides the lift and retains it in such a position that the rods 216 are disposed rearwardly from the vertical until it closely approaches a discharging place or position which is substantially directly to the right of the upper shaft 164. The angle of the lift with respect to the horizontal is increased as it passes over the sprockets 170, but it is nevertheless retarded from assuming the angle that it would if it followed the curvature of the sprockets, i. e., it is retained against moving over vertical. This phase of the matter will be latter described in detail. However, as the lifts approach this position, the knee portion 254 of the cam track guides the lift so that it eventually is thrown over vertical in the opposite direction as illustrated particularly in Figures 8 and 7. A reference line 260 is indicated on Figure 8 to show the position of the lift being thrown over vertical. This throw of the lift is not great and the extension line 260 indicates that it is at an angle with the vertical upright member of the frame structure.

The bent up portions 220 of the rods 218 form stop means for retaining the pans on the lifts in all positions thereof until they reach the discharging position.

The lifts continue downwardly and the shape and positioning of the various portions of the cam track from this point on are not critical but the movements of the lifts in their various positions are fully illustrated in Figure 7.

The rods 216 on the lifts 202 are similar in extent to the length of the rods 82 on the platform 54 and as the lifts move on the conveyor, the rods 216 pass between the rods 82. The rods of the lift therefore lift the pans from the rods 82 and carry them upwardly. The timing between the conveyor and the cam shaft 70 is such that after each pan is lifted off of the rod 82, the trip plate 120 is depressed to permit another pan to slide down the platform and onto the rods 82 for lifting by the succeeding lift 202.

Attention is called to the fact that there is no structural connection between the conveyor and the platform 54 except the driving chains, although there is of course effective cooperation between the two because of the lifts or shelves 202 lifting the pans from the rods 82.

DISCHARGING SECTION

Fulcruming fingers

As noted above, the pans from conveyor are discharged at a position approximately to the right or to the rear of the shaft 164 at the upper end of the conveyor. The means which forms the immediate agent for deflecting the pans from the lifts of the conveyor consists in a plurality of transversely spaced fulcruming fingers 262. The illustration of Figure 7 includes the fulcruming fingers 262 and shows the operative relation between the fulcruming fingers and the conveyor. However, for a detail illustration of the fulcruming fingers attention is directed to Figures 11 and 12. Immediately to the rear of the conveyor and in position for supporting the fulcruming fingers is a transverse bar 264 secured to frame elements 266 of the machine, and to which the fingers are secured, as by welding. The fingers 262 extend generally upwardly from the bar and slightly forwardly, having a substantially horizontal upper surface 268. The fingers 262 are spaced similarly to the space of the rods 216 and are positioned so that they are in the vertical projection of the lifts 262 at that position and thereby the rods 216 pass between the fulcruming fingers. It is obvious that the transverse members 214 are in position to clear the upper ends of the fulcruming fingers, but the rods 216 and also the bent portions 220 of the rods 218 extend into the projection of the fingers so that the fulcruming fingers actually by relation pass through the lifts, and are engaged by the pans on the lifts. The subsequent action is that the pans are forcibly tipped over center into inverted position by reason of the lifts 202 being thrown over center vertically. This action will be more fully elaborated on later.

It should be noted that the bar 264 supporting the fulcruming fingers is mounted in the discharging section of the machine which was previously identified by the numeral 52. The particular location of the bar 264 is rearward of the dividing line between the frame elements 42 and 44 so that when the frame sections 40 and 38 are separated, the fulcruming fingers remain mounted in the rear section 38. It should also be noted that the plates 240 for mounting the cam tracks 236 and 238 are mounted on the front section 40 and although the plates do extend slightly rearwardly thereof, they are not fixedly mounted on the rear section 38. It is obvious therefore that when the sections 38 and 40 are separated, the conveyor and all of its appurtenances are carried by the front section 40. However, it is likewise pointed out that although there is no structural connection between the operating parts in the sections 38 and 40, there is nevertheless effective cooperation between them.

Knock-out bar assemblies

The knock-out bar assemblies, two of which are provided, are indicated generally at 270 and a description thereof can be more effectively achieved by first describing the means for mounting them. The bar assemblies 270 slope downwardly to the rear as illustrated clearly in Figure 11. The bar assemblies are adapted for depositing thereon of pans of loaves in inverted position as will be referred to later.

A rotatable transverse shaft 272 is mounted in bearings 274 on certain frame elements such as 262. The shaft 272 at one end extends outwardly beyond the machine and the covering 46 thereon, where a hand wheel 276 is provided for rotating the shaft. Such a hand wheel may be provided at either end, as indicated by the dot-dash outline of a wheel at the other end. Another transverse shaft 278 is rotatably mounted in bearings 280 mounted on the structural elements 266, the two shafts being provided with sprockets 282 over which is trained a chain 284 which is effective for rotating the shaft 278 upon rotation of the shaft 272, so that the two shafts therefore are rotated together and in the same direction. Each of the two shafts 272 and 278 has end portions having oppositely directed threads.

Mounted on the front shaft 272 are threaded bearing sleeves 286 one for each of the knock-out bar assemblies 270. Each sleeve 286 is provided with interior threads appropriately directed for cooperation with the respective threaded portion of the shaft, and each sleeve is provided with an upstanding web portion 288 for securement thereto of a bar element 290. The shaft 272 is located adjacent the bar 264 and fulcruming fingers so that the front end of the bar element 290 is adjacent the fulcruming fingers. The bar element 290 is an elongated platelike member which may be welded to the web 288 or directly to the sleeve 286 and the top of the front end of the bar element 290 is adjacent the top of the transverse member 264. Rearwardly of the front end is a cut-out portion 292 forming a reduced rear portion which comprises the greater part of the length of the bar element and is mounted or supported on the rear shaft 278 by means presently to be described.

Operatively mounted on the rear shaft 278 is a pair of mounting members 294. Attention is directed to Figures 12, 17, 19 and 20 for the details of construction thereof. Each mounting member 294 comprises a sleeve element 296 having interior threads for engagement with the threaded portions of the shaft 278 and being threaded in the appropriate direction thereof. A pair of plate elements 298 are rotatably mounted on the sleeve 296 in spaced apart relation and provided with bearing means such as the ball bearing means 300 (Figure 20) for rotation or swinging movement about the sleeve 296. The rear end of the bar element 290 extends between the plate elements 298 and rests directly on the sleeve 296 (Figure 20) and is preferably welded thereto for securely mounting the bar element in position. The plate elements 298 have a profile shape such as illustrated in Figures 11 and 17 and extend upwardly above the bar assembly 270 and have a forwardly facing surface 302 which is disposed substantially vertically. A knock-out bar 304 forms a counter part of the bar element 290 and is of plate-like shape similar to the element 290 and adapted to be in vertical alignment therewith. The knock-out bar 304 is disposed between the plate elements 298 and secured therein as by means of bolts or pins 306 (Figures 17 and 19) so that the knock-out bar is fixed to the plates and swings therewith. The knock-out bar 304 is adapted to fall into the cut-out portion 292 and when in such position form a regular contour with the bar element 290, that is, the forward end of the knock-out bar is adjacent the forward end of the cut-out portion 292.

The upper edge of the knock-out bar 304 is provided with a channel shape cushioning member 307 (Figures 17 and 18) extending substantially the length of the bar and covered by a channel shape protective covering 308 which is preferably a metallic member. The rear end of the covering 308 is secured as by riveting at 310 to the knock-out bar and the front end is provided with a downwardly extending ears 312 which are secured to the front end of the knock-out bar. The protective covering 308 is adapted to yield to some extent between its points of securement at the ends, so that when pans fall thereon it will yield and be cushioned by the material 306 which may be of rubber or rubber product or other desired cushioning means.

As noted in Figures 11 and 17 the surface 302 of the plate elements 298 extend above the knock-out bars 304. A transverse actuating element 314 is fitted against the upper surface of the knock-out bars and the front surfaces 302 of the plate elements of the two sets or mounting members 294, and extends transversely where its ends are secured as by welding to end plates 316. The end plates 316 are disposed adjacent the ends of the shaft 278 and outwardly beyond the space required for the widest pans which will be accommodated. Each plate 316 is provided with a hub portion 318 (Figures 11, 12 and 21). The hub portion 318 is mounted by means of bearings such as the ball bearings 320 (Figure 21) on a sleeve 322 which may be securely mounted on the shaft 278. The bearing means 320 enable free swinging motion of the end plates 316 with respect to the shaft 278.

Also secured on the hub 318 is a crank arm 324 which is rigid with respect to the hub and swings on rotation of the hub. The swinging end of the crank arm 324 is provided with a pin 326.

Mounted on the transverse actuating member 314 are ears or lugs 328 adjacent the ends thereof and secured to the ears 328 are tension springs 330 the other ends of which are secured to the transverse member 264. The latter member 264 serves as a convenient anchoring means but the springs of course can be anchored at other points. The springs 330 act through the lugs or ears 328 and thereby the transverse member 314 and end plates 316 and serve to rotate the end plates 316 in a counterclockwise direction and carry therewith all elements mounted on the end plates, or moved as a result of the movement of the end plates.

The transverse member 314 does not have any positive connection with the plate elements 298 or the bar assemblies so that the bar assemblies can be moved laterally toward or from each other, it being recalled that the member 314 is fixed in position by its securement to the end plates 316.

Rotation of the hand wheel 276 rotates the shaft 272 and acting through the chain 284 also rotates the shaft 278 in the same direction. The bearing sleeves 286 and the sleeves 298 are moved as a result of the rotation of the shafts toward or from each other because of the oppositely directed threaded portions on the shafts. The sleeves 298 carry the forward ends of the bar elements 290; the mounting members 294 are carried by the sleeves 296 and the mounting members carry with them the rear ends of the bar elements 290 and the knock-out bars 304 so that the whole bar assemblies are moved laterally toward and from each other upon rotation of the shafts.

Each end plate 316 is provided with a cam follower roller 332 for a purpose which will be described later.

*Conveyor for empty pans*

Disposed to the rear and slightly below the bar assemblies 270 is a conveyor illustrated generally by the numeral 333 as shown most clearly in Figures 6 and 11. For purposes of mounting the conveyor, structural elements such as members 334 are included in the frame and provided with bearings 335 in which are journalled shafts 336 disposed transversely across the machine and spaced longitudinally from front to rear. The shafts 336 are provided with rollers 337 over which is trained an endless belt 338. The front shaft 336 is provided with a sprocket over which is trained a drive chain 338', deriving its driving power from a source to be described. Pans are discharged from the knock-out bars 304 and reinverted onto the conveyor belt 338. The conveyor 333 leads from adjacent the bar assemblies 270 to a position adjacent the exit opening 24 in the machine from which the empty pans are delivered onto another conveyor which may be part of the general equipment of the bakery and leading to a pan filling machine.

*Bread catcher*

Reference is directed to Figures 1, 6, 11, 22 and 23 for a detailed description of the bread catcher. The bread catcher is indicated generally by the numeral 339 and includes a frame 340 and a bread catcher pan 341. The frame 340 includes a pair of transversely spaced arms 342 which may be of angle shape in cross section and are pivoted for swinging movement on a shaft 344 disposed transversely across the machine. The shaft 344 is trunnioned in bearings 346 supported by members of the framework. The arms 342 are interconnected by a transverse rod 346a adjacent the rear, or pivoted ends of the arms, which may be welded to the arms. A bracket 348 is secured to the front or swinging end of each of the arms 342 and welded to the brackets 348 is another transverse rod 350. The arms may also be interconnected by another transverse member 352. Mounted on one of the arms 342 (or both if desired) is a bearing bracket 354 adapted to form a support for a pivotal mounting for the actuating mechanism of the bread catcher.

The bread catcher pan 340 is made up of a flat sheet metal portion 356 forming the base thereof, at the rear of which is an upstanding portion 358. A downwardly extending hook member or flange 360 is secured to the upright member 358 at the rear or pivoted end of the bread catcher pan and is adapted to hook over the transverse rod 346a. On the underside of the base 356 adjacent the swinging end thereof is another hook means 362 which extends downwardly and forwardly therefrom and is adapted to hook under the transverse rod 350 and be positioned between the brackets 348 which limit sidewise movement of the bread catcher pan and prevent its being inadvertently displaced transversely of the frame.

On the upper side of the base 356 is a plurality of troughs 364 formed by a stainless steel, sheet metal element 366 curved in such a way as to form concave portions having open upper sides to form the troughs. The troughs in the particular illustration are four in number to correspond with the number of pan elements in the pan strap 26. The troughs 364 extend longitudinally of the machine or from the front to rear, and their front ends are open for permitting the loaves to slide out of them.

The bread catcher pan 340 is readily demountable from the frame 338 merely by lifting upwardly on the rear or pivoted end, so that the hook means 360 is unhooked from the rod 346a, and then moving the pan rearwardly so that the hook means 362 is unhooked from the rod 362. Other bread catcher pans can then be inserted such as one having three troughs or one having five troughs, etc. In all cases the width of the base 356 and the hook means 360 and 362 is the same so that the pan can be readily inserted in place without the necessity of accurately aligning the pan with respect to the longitudinal center line of the machine. Whatever size bread catcher pan is employed the troughs 364 are disposed symmetrically about the longitudinal center line of the machine so that an equal number is on each side, and if an odd number is employed the middle trough lies on the longitudinal center line.

Secured to the shaft 344 for rotation therewith, adjacent each arm 342 is a hub 368 on which is mounted a crank arm 370. Pivotally connected at the outer end of the crank arm 370 is a link 372 and in the other end of the link 372 is a slot 374 which receives the pin 326 on the crank arm 324 previously described. The pin 326 has sliding engagement in the slot 374 and the connection thus provided constitutes a lost motion connection.

Also secured to the hubs 368 are cams 376 each provided with a camming surface 378 the shape of which is best illustrated in Figure 11. The cams 376 are adapted to swing or rotate upon swinging of the frame 336 and the camming surfaces 378 are adapted to be engaged by the cam follower rollers 332.

*Actuating mechanism for bread catcher*

A link 380 is pivoted at one end in the bearing bracket 354 and at its other end in the forked end 382 of a swinging lever arm 384 which is pivotally mounted on a shaft 386 trunnioned in bearings 388 supported by the frame. In the present illustration only one such actuating mechanism for the bread catcher is illustrated, but it will be understood that a similar arrangement can be provided on the opposite side of the machine. The lever arm 384 is provided with an elongated slot 390. An actuating shaft 392 is trunnioned in bearings 394 supported by the frame, and mounted on the shaft 392 is another crank arm 394a having a pin 396 in its swinging end fitted in the slot 390 for sliding engagement therein. The shaft 392 is adapted for full rotation in one direction and when so rotated the pin 396 working in the slot 390 swings the lever arm 394a alternately to the full and dotted line positions shown in Figure 11. The shaft 392 is provided with a sprocket 398 (Figure 6) over which is trained a chain 400 which is also trained over a sprocket 402 secured to what will be referred to as a drive shaft 404 which in turn is mounted in bearings 406 supported by the framework. The drive for the shaft 404 will be referred to later.

Upon swinging of the lever arm 384 as referred to above, the bread catcher 336 is lowered and raised. When the lever arm 384 is in its dotted line position the bread catcher is lowered to the dotted line position shown in Figure 11, and conversely when the lever arm is swung to its full line position, the bread catcher is raised to its full line position, which is closely adjacent and below the knock-out bar assemblies 270.

When the bread catcher is swung to its lowered position the crank arm 370 is swung upwardly, and acting through the link 372, swings the crank arm 324 upwardly and this in turn rotates the hubs 318 which carry the end plates 316 upwardly to their dotted line position. The swinging of the end plates 316 carries the transverse member 314 which, acting against the surfaces 302, swings the plate elements 298 which in turn carry the knock-out bars 304 upwardly, rotating them in a clockwise direction to the dotted line position shown in Figure 11. Upon reverse movement, i. e., when the bread catcher is moved from its lower to upper position, the lost motion connection provided by the slot 374 permits the springs 330 to retract the knock-out bars 304 downwardly. Also in the upward movement of the bread catcher the cams 376 are rotated to their full line position, and in the movement of the knock-out bars to their retracted or full line position, the cam follower rollers 332 engage the camming surfaces 378, which prevents the knock-out bars from being slammed down into their original position. The cams 376 move continuously and the curvature of the camming surfaces 378 is such that the bars 304 do move to their powered position but at a retarded rate than would otherwise occur. When the bread catcher is in its fully raised position the knock-out bars are in their fully lowered position.

The bread catcher 336 is adapted to receive the loaves from the pans inverted onto the bar assemblies 270, and to discharge them when the bread catcher is swung downwardly. The troughs 364 of the bread catcher pan are open at the swinging end thereof, as referred to above, and as the bread catcher is lowered, the loaves slide out of the troughs.

Bread chute

The bread chute is indicated generally at 408 and is in the form of an expansive sheet metal element 410 having a predetermined shape as illustrated best in Figure 11, and extending transversely across the machine to substantially the full width of the bread catcher, as illustrated in Figure 12. The bread chute element 410 is preferably of stainless steel and at its upper end is provided with a turned over flange 412 securing the chute to a bracket 414 extending transversely across the machine and mounted in brackets 416. The upper end of the chute 408 is adjacent the forward swinging end of the bread catcher when the latter is in its upper position. The chute then extends vertically and is inclined for a portion of its vertical extent toward the rear of the machine, and merges into a bottom curved portion 418 which terminates in a portion which closely approaches the horizontal, the lower end being supported by appropriate structural frame members. The shape of the chute 408 is such that when the bread catcher is in its upper position it is close to the swinging end of the bread catcher, but when the bread catcher swings downwardly the swinging end thereof recedes from the bread chute.

Bread conveyor

The bread conveyor is adapted to receive the loaves which slide down the bread chute 408 and deliver them from the machine.

The conveyor is illustrated as a whole at 420 and reference is directed to Figures 6, 11 and 13 for complete details of the conveyor. The conveyor includes four shafts 422 extending longitudinally of the machine, two of each of which are disposed vertically with respect to each other at the sides of the machine. The shafts 422 are trunnioned in appropriate bearings 424 supported by the framework. Each shaft is provided with a pair of longitudinally spaced sprockets 426 mounted for rotation therewith. The respective sprockets on each side of the conveyor are in alignment for receiving conveyor chains 428 each of which is trained over four of the transversely aligned sprockets. Interconnecting the two conveyor chains at spaced intervals therealong are a plurality of bars 430 which are secured to the chains by means of ears 432 provided on certain of the links making up the chains.

Disposed below the conveyor thus described is a plate 434 preferably of stainless steel and underlying the whole conveyor. The conveyor is of limited extent longitudinally of the machine and preferably of an extent in that direction sufficient to receive loaves of bread lying with their long dimensions transversely of the conveyor. The plate 434 is disposed horizontally and is positioned substantially at the level of or slightly below the lower terminal end of the bread chute 408. One end of the plate 434 terminates adjacent the exit opening 22 and the loaves are discharged through that opening by the conveyor. The conveyor can be caused to run in either direction for conveying the loaves out of the side of the machine as desired, and it may be that the discharge opening 22 will be located on the opposite side from that shown. One of the shafts 422 has secured thereto a sprocket 436 for drive by a chain 438.

Main drive

As mentioned above the drive for the whole machine is derived from the electric motor 150 which is transmitted to the main drive chain 162. The complete drive is illustrated in Figure 6 to which attention is directed for an overall illustration of the operation. The main drive chain 162 is trained over the sprocket 160, the sprocket 172, and a sprocket on the shaft 404 which will be termed the main drive shaft. Drive is transmitted through the sprocket 172 to the main conveyor, and from the lower end of the conveyor drive is transmitted through the chain 78 to the cam shaft 70 and the chain 66 for the power rollers 60 in the platform 54. Drive is then transmitted from the main drive shaft 404 through the chain 400 to the shaft 392, and similarly drive is transmitted through the chain 338' to the pan conveyor 333.

A third sprocket is provided on the shaft 404 for driving the chain 440 which drives a gear box 442 having a power transmitting shaft 444 on which is mounted a sprocket for receiving the chain 438 for driving the bread conveyor 420.

The foregoing constitutes the main drive of the machine and it should be remembered that the two chains 104 and 284 are not part of the main drive, but are for the purpose of rotating the respective shafts for making adjustment of the guide rails and the knock-out bars.

OPERATION

Pan straps 26 are conveyed down the conveyor 56 as previously described onto the platform 54. The trip mechanism 120 controls the movement of the pan straps onto the platform so that only one at a time is permitted to be on the platform. The guide rails 86 are adjusted to accommodate the particular pan straps employed such as those made up of four individual pan elements. The guide rails are so positioned and adjusted that the pan straps are centered transversely of the machine. After one pan strap is admitted to the platform 54 it gravitates or is forced down onto the rods 82 and is held thereon by the upturned portions 84.

The conveyor then operates to carry the lifts 202 so that the rods 216 pass between the rods 82 and lift the pans from the rods 82. The timing mechanism between the trip 120 and the lifts 202 is such that each pan is retained against movement onto the platform until the previous one is lifted off of it.

As each lift 202 carries the pan upwardly the lift is disposed at an angle inclined outwardly and upwardly whereby the pan thereon settles against the upturned portions 220 of the rods 218 which form a backstop for the pans. As the lifts continue to move upwardly throughout the straight vertical portion of the conveyor, they remain at the same angle, but as the lifts reach the top of the conveyor they are inclined at a greater angle to the horizontal, but still below the vertical so that the pans are not tipped off of the lifts, but rest against the stops 220 while actually lying on the rods 216. This relationship continues in the case of each lift and pan, until the lift reaches the position illustrated in Figure 8 in which the pan engages the fulcruming fingers 262. It will be recalled that the fingers 262 actually extend into the path of the lift, i. e., between adjacent rods 216 forming the lift, and are engaged by the pan. When the pan engages the fulcruming fingers and at that particular instant, the lift is still inclined from the vertical having not yet reached the vertical, but as it continues past that position illustrated in Figure 9, and to the position shown in Figure 7 the lift is caused to swing past the vertical due to the shape of the cam track segment 238. As the lift is swung past center, it engages the pan in such a manner as to forcibly and positively tip it over in a swinging motion about the fulcruming fingers as a pivot, into inverted position on top of the knock-out bar assemblies 270. Attention is also directed to Figure 9a which shows in greater detail the fulcruming fingers and the swinging of pivoting movement of the pan in the inverting operation.

The bar assemblies 270 are pre-positioned so that they are disposed as illustrated in Figure 15 in the case of a pan strap having four pan elements. When the pan strap falls onto the bar assemblies the knock-out bars are disposed in vertical alignment with the spaces between adjacent pan elements. In this particular case the knock-out bars are adjusted inwardly so that each is positioned inwardly from the outermost pan element, and as above described, there is a space between the pan elements so that no portion of the pan elements overlies the knock-out bars.

The fall of the pan strap onto the knock-out bars is normally sufficient to jar the loaves out of the pans, and they then fall past the knock-out bars, or it may be said that they fall through the knock-out bars. The knock-out bar assemblies may also be referred to as a support for sustaining the pans, having openings for passage of the loaves therethrough.

The guide rails 86 are always equally spaced on opposite sides of the center line of the machine, and the knock-out bars similarly spaced, whereby the pan straps on proceeding through the machine are always centered with respect to the machine and the knock-out bars after being pre-set, are always in proper position to receive the pan straps, wherein they are disposed in vertical alignment with the spaces between adjacent pan elements. The relationship is not lost when the pan straps are transferred from the platform 54 to the conveyor lifts, and similarly the relationship is maintained when the pan straps are transferred from the conveyor lifts onto the knock-out bars.

In the case where a pan strap having three pan elements is employed, the guide rails 86 are set inwardly toward each other to engage the sides of the pan and likewise the bar assemblies 270 are set inwardly to the position illustrated in Figure 14. Likewise if a pan strap having five pan elements is employed, the guide rails are set apart a greater distance from each other and the knock-out bar assemblies are also set apart a greater distance so that they are then in the position illustrated in Figure 16.

An advantageous feature of the novel construction of the knock-out bars is that if it should happen that some of the loaves do not fall out upon the impact of the pan falling down onto the bars, the pan then slides down the bars and engages the transverse member 314 and a jar is caused at this position, assuring that the loaves will all then fall out if they did not fall out on the first impact.

The timing mechanism between the various elements is such that the knock-out bars 304 are down in their lower or normal position illustrated in full lines (Figure 11) just before each pan is discharged from the conveyor. At the same time the bread catcher is in its uppermost position and receives the loaves which have fallen out of the pans. It will be recalled also that the bread catcher pan 340 is arranged with its troughs under respective loaves and the loaves then fall into individual troughs. Since the pans are inverted the loaves of course fall down in inverted position in the bread catcher. An important advantage of this arrangement is that the loaves fall a minimum distance into the bread catcher, so that the danger of the loaves being injured in their fall is minimized. As the loaves fall into the individual troughs of the bread catcher, they are cradled in the troughs, the top surface of each loaf, which is then lowermost, has substantially full contact with the trough, resulting in an additional feature whereby the possibility of injury to the loaves is kept at a minimum.

Immediately after the loaves fall into the bread catcher, the actuating mechanism swings the bread catcher downwardly and the space between the swinging end of the bread catcher and the bread chute gradually increases, and finally a position is reached wherein the space is great enough for the loaves to slide between the bread catcher and the chute. In this position the bread catcher is inclined downwardly and the loaves readily slide out, whereupon the loaves continue sliding down the bread chute, and since the bread chute is inclined rearwardly and the bread catcher is at that time inclined forwardly, the bottoms of the loaves, which were disposed uppermost, engage the bread chute and as the loaves continue on down the bread chute they are re-inverted so that they emerge from the bottom end of the bread chute in upright position. The loaves are let down gradually onto the bread chute, i. e., they do not tumble, as in the case of previously known machines, and therefore there is virtually no likelihood in this connection of injury to the loaves. In previously known machines, not only did the loaves fall some distance, but they struck a turn-over bar, which injured many loaves, a disadvantage absent from the present machine.

A further feature of synchronization among the various operating parts is manifested in the bread conveyor 240. The bars 430 which are spaced along the conveyor are always arranged in such a position that the group of loaves (for example four in number) which are discharged from the bread catcher and bread chute at any one time, can slide into the conveyor between adjacent bars. The conveyor is continuously running and immediately after the loaves slide into the conveyor one of the bars carries the group of loaves out, and that particular bar is then immediately thereafter out of the way for permitting a successive group of loaves to slide down the bread chute and into the conveyor; the next group of loaves then are positioned between that particular bar and the next succeeding bar.

Simultaneously with the downward swinging of the bread catcher the knock-out bars 304 are raised or swung upwardly about the shaft 278 as a pivot point. The detailed operation of this action was described above but at this point we emphasize the synchronization between the action of the bread catcher and the knock-out bars. The upward swinging movement of the knock-out bars 304 carries the pan thereon upwardly and the bars swing to a position beyond the vertical as illustrated in dotted lines in Figure 11. The pan is then discharged off of the knock-out bars and is re-inverted onto the conveyor 333. Emphasis is placed on the fact that the pans are forcibly and positively re-inverted into upright position by the action of the knock-out bars. The conveyor then carries the pans outwardly of the machine and deliver them to another conveyor as desired.

Immediately after discharge of each empty pan from the knock-out bars, the knock-out bars are permitted to be retracted under the action of the springs 330, although controlled by the upward movement of the bread catcher. As the bread catcher moves upwardly the crank arm 370 carries the link 372 downwardly and, by reason of the lost motion connection provided by the slot 374, permits the springs to retract the knock-out bars. The cam follower rollers 332 engaging the camming surfaces 378, prevent rapid or snap action return of the knock-out bars.

After the bread catcher and knock-out bars are returned to their starting or normal position, the next successive lift 202 of the conveyor is in position for discharging another pan of loaves and the cycle is repeated.

Among the various advantages of the present invention attention is directed particularly to the following unusual features.

The capacity of the depanning machine of the present invention is greatly in excess of any heretofore known—upwards of 2,000 pan straps can be emptied per hour.

The pans of loaves are forcibly and positively inverted by the action of the lifts 202 in actually forcing the pans in a tilting motion to inverted position.

The empty pans are then forcibly and positively re-inverted to upright position by the action of the knock-out bars 304 carrying the pans and inverting them.

The loaves of bread emerge from the machine in upright position. The absence of this feature has been a disadvantageous feature in previously known machines. Obviously when a pan is to be emptied it must be inverted and the loaves of course are inverted also, but it is desired that they be re-inverted for further treatment. The present machine accomplishes this result.

The fact that the lifts 202 are retained in a position close to the vertical when they are adjacent the fulcruming fingers and knock-out bars, results in a compact arrangement; considerably less space is required than would be necessary if the lifts extended horizontally at this position.

The machine can be separated in sections, namely the sections 38 and 40 (after removing the driving chains), and the sections handled with greater convenience due to the smaller size. This advantageous feature results from the fact that there is no positive connection between the operating parts in the two sections, except the chains. It may also be pointed out that the frame may be constructed so as to be spearable between the loading section and the lift section, if desired, and this is contemplated although the two portions are herein illustrated as a single section.

Although the foregoing description of the machine had to do with pans of loaves, it is to be understood that that it may be employed for handling other articles, and in particular for emptying other kinds of containers containing various kinds of articles.

While we have herein shown and described a preferred embodiment of our invention, manifestly it is susceptible of modification and rearrangement of the parts without departing from the spirit and scope thereof. We do not, therefore, wish to be understood as limiting our invention to the precise form herein disclosed, except as we may be so limited by the appended claims.

We claim as our invention:

1. In a depanning machine, a pair of laterally spaced bar assemblies, each bar assembly including a lower supporting bar and an upper pivoted bar in vertical alignment therewith, means for mounting said bar assemblies in position for receiving and supporting pans, conveyor means for depositing pans on said bar assemblies, said bar assemblies being movable laterally toward and from each other, means for moving said bar assemblies toward and from each other, and means for swinging said upper pivoted bars about their pivot axes for discharging pans therefrom.

2. In a depanning machine, a pair of laterally spaced bar assemblies, each bar assembly including a lower supporting bar and an upper pivoted bar in vertical alignment therewith, means for mounting said bar assemblies in position for receiving and supporting pans, conveyor means for depositing pans on said bar assemblies, transverse rotatable shafts adjacent the ends of the bar assemblies, each shaft having threaded portions of oppositely directed threads, threaded bearing means mounted on said threaded portions and supporting said bar assemblies, said bar assemblies being movable laterally toward and from each other on rotation of said shafts, and means for swinging said upper pivoted bars about their pivot axes for discharging pans therefrom.

3. In a depanning machine, a pair of laterally spaced bars mounted for movement to a normal position for receiving and supporting pans, transverse rotatable shafts adjacent the ends of said bars in their normal position, said shafts having threaded portions of oppositely directed threads, bearing means for mounting said bars for swinging movement about one of said shafts as a pivot, said bearing means being threaded and having engagement with the oppositely threaded portions of the shaft, means for supporting said bars in said normal position, threaded bearing means for mounting said supporting means and having engagement with the oppositely threaded portions of the other of said shafts, and driving means interconnecting said shafts, for simultaneous rotation to move said bars and their supporting means laterally toward and from each other for accommodating pans of different widths.

4. In a depanning machine, a pair of laterally spaced bars, said bars being movable to a position for receiving and supporting pans, means for forcibly depositing pans on said bars, means on each of said bars for cushioning the impact of the pans on being deposited on the bars, each cushioning means comprising a strip of resilient material on the upper edge of the bar and a metallic element overlying the resilient material and connected to the bar, and means for at least partially inverting said bars for discharging pans therefrom.

5. In a machine of the character disclosed, a shaft, a pair of laterally spaced bars pivotally mounted on said shaft, said bars being laterally movable toward and from each other, said bars being swingable to a position for receiving and supporting pans, plates pivoted on said shaft adjacent the ends thereof, a transverse member secured to said plates, said transverse member having engagement with said bars and said bars being movable laterally with respect to the transverse member, means for rotating said plates and thereby swinging said transverse member, and said transverse member thereby swinging said bars about said shaft as a pivot for discharging pans from the bars.

6. In a machine of the character disclosed, a shaft, a pair of laterally spaced bars pivotally mounted on said shaft, said bars being laterally movable toward and from each other, said bars being swingable to a normal inclined position in which the swinging ends thereof are upraised, said bars in said normal position being adapted for receiving and supporting containers, plates pivoted on said shaft adjacent the ends thereof, a transverse member secured to said plates, said transverse member having engagement with said bars but being detached therefrom and said bars being movable laterally with respect to the transverse member, said transverse member extending above the upper surface of said bars and forming abutment means for engagement by containers on said bars, means for rotating said plates and thereby swinging said transverse member, and said transverse member thereby swinging said bars about said shaft as a pivot for discharging containers from the bars.

7. In a machine of the character disclosed, a pair of spaced transverse rotatable shafts each of which has oppositely threaded portions, drive means interconnecting said shafts, a pair of mounting members on one of said shafts, each mounting member including a threaded hub and a pair of plate elements rigidly secured together in spaced apart relation, said plate elements being rotatable on the hub, a pair of lower supporting bars each having one end positioned between the plate elements of one of said mounting members, threaded supporting means on the other of said shafts and supporting the other ends of said supporting bars thereon, a pair of upper bars each of which has one end rigidly secured between the plate elements of one of said mounting members, said plate elements having offset portions with respect to said upper bars, said upper bars being swingable with said mounting members and movable into positions overlying the lower supporting bars, an end plate rotatable mounted on each end of said first shaft, a transverse member secured to said end plates in engagement with said offset portions of said plate elements and with said upper bars but being detached therefrom, rotation of said shafts being effected for moving said upper and lower bars laterally toward and from each other, rotation of said end plates being effective for swinging said transverse member and thereby said mounting members and upper bars about said first shaft as a pivot, and means for rotating said end plates.

8. In a machine of the character disclosed, a pair of laterally spaced bars mounted for pivotal movement into and out of a position for receiving and supporting pans, spring means biasing said bars into said receiving position, means for swinging said bars out of said position, and means reacting against said spring for retarding the speed of movement of said bars into said receiving position under the influence of said spring means.

9. In a machine of the character disclosed, a pair of laterally spaced bars mounted for pivotal movement into and out of a position for receiving and supporting pans, spring means biasing said bars into said receiving position, operating means movable in one direction for swinging said bars out of said position and movable in a return direction for permitting said bars to be moved into said position under the influence of said spring means, and cam means actuated by said operating means in the return direction thereof for retarding the speed of movement of the bars into said receiving position under the action of said spring means.

10. In a machine of the character disclosed, a pair of laterally spaced bars mounted for pivotal movement into and out of a position for receiving and supporting pans, spring means biasing said bars into said position, a rotatably mounted shaft, a lever arm fixed on said shaft, lost motion means interconnecting said lever arm and said bars, a cam fixed on said shaft, cam follower means associated with said bar and engageable with said cam means, rotation of said shaft in one direction being effective for swinging said bars out of said position, and rotation of the shaft in the other direction permitting movement of said bars to said position under the influence of said spring means, said cam means on engagement by said cam follower being effective for retarding the speed of return movement of said bars to said position.

11. In a depanning machine comprising a pan strap supporting means adapted to have deposited thereon a pan strap adapted to contain loaves of bread in inverted position whereby the pan strap is sustained by the supporting means and the loaves drop out of the pan strap; the improvement comprising a frame pivoted below said supporting means, said frame having laterally spaced members pivoted for swinging movement, a first transverse bar secured to said members adjacent the swinging ends thereof and a second transverse bar secured to said members adjacent the pivoted ends thereof, and a bread receptacle mounted on said frame, said frame being movable to a position wherein said bread receptacle is disposed immediately below said supporting means, the top of said bread receptacle being open for receiving loaves, the swinging end of said bread receptacle being open, means adjacent the swinging end of said bread receptacle detachably secured to said first transverse bar, and means on the pivoted end of said bread receptacle detachably secured to said second transverse bar, said frame being swingable downwardly for lowering the swinging end of said bread receptacle for permitting the loaves to slide therefrom, said means being effective for retaining said bread receptacle pan on said frame in all positions of the frame and permitting quick detachment of the bread receptacle from the frame.

12. In a machine of the character disclosed, a pair of spaced bars pivotally mounted for swinging movement and swingable to a position for receiving pan straps adapted to contain bread loaves in inverted position whereby the loaves fall out of the pan straps, a bread catcher pivotally mounted for swinging movement below said bars and swingable to a position for catching the loaves from the pan straps, said bars being swingable to a position for discharging the pan straps therefrom, said bread catcher being swingable to a position for discharging the loaves therefrom, linkage interconnecting said bars and bread catcher, and operating means for swinging said bread catcher, said linkage being operable for swinging said bars to discharging position while said bread catcher is being moved to discharging position.

13. In a machine of the character disclosed, a pair of spaced bars pivotally mounted for swinging movement and swingable to a position for receiving pan straps adapted to contain bread loaves in inverted position whereby the loaves fall from the pan straps, a bread catcher pivotally mounted for swinging movement below said bars and swingable to a position for catching the loaves from the pan straps, said bars being swingable upwardly to a position for discharging the pan straps therefrom, said bread catcher being swingable downwardly to a position for discharging the loaves therefrom, a crank arm secured to said bars, a crank arm secured to said bread catcher, a link interconnecting the swinging ends of said crank arms, and operating means for swinging said bread catcher, said link being operable for swinging said bars to discharging position while said bread catcher is being moved to discharging position.

14. In a machine of the character disclosed, a pair of bars pivotally mounted for swinging movement and swingable to a position for receiving pan straps containing bread loaves in inverted position whereby the loaves fall from the pan straps, spring means biasing said bars to said position, said bars being swingable to a position for discharging the pan straps therefrom, a bread catcher pivotally mounted for swinging movement below said bars and swingable to a position for catching said loaves, lost motion linkage interconnecting said bars and bread catcher, and operating means for swinging said bread catcher, said lost motion linkage being operable for swinging said bars to discharging position and being effective for permitting said bars to return to their first position under the influence of said spring means.

15. In a machine of the character disclosed, a pair of spaced bars pivotally mounted for swinging movement and swingable to a position for receiving pan straps adapted to contain bread loaves in inverted position whereby the loaves fall from the pan straps, spring means biasing said bars to said position, said bars being swingable to a position for discharging the pan straps therefrom, a bread catcher pivotally mounted for swinging movement below said bars and swingable to a position for catching said loaves, lost motion linkage interconnecting said bars and bread catcher, operating means for swinging said bread catcher, said lost motion linkage being operable for swinging said bars to discharging position while said bread catcher is being moved to discharging position and being effective for permitting said bars to return to their first position under the influence of said spring means, cam means on said bread catcher, and a cam follower on said bars engageable with said cam means, said cam means and cam follower reacting against said spring means and being operable for reducing the speed of movement of said bars in swinging to their first position under the influence of said spring means.

16. In a depanning machine, a pair of spaced bars pivotally mounted for swinging movement to a position for receiving pan straps adapted to contain bread loaves in inverted position wherein the loaves fall out of the pan straps, and for swinging movement to a position for discharging the pan straps therefrom, a bread catcher pivotally mounted for swinging movement below said bars to a position for catching said loaves and to a position for discharging the loaves, linkage interconnecting said bars and bread catcher, a pivotally mounted lever arm, means interconnecting the swinging end of said lever arm and said bread catcher, and a crank arm operably mounted for swinging said lever arm, said lever arm on swinging thereof being operable for swinging said bread catcher, and said bread catcher on swinging thereof, being operable through said linkage for swinging said bars.

17. In a depanning machine, a pair of bars pivotally mounted for swinging movement to a position for receiving pan straps adapted to contain bread loaves in inverted position wherein the loaves fall out of the pan straps, and for swinging movement to a position for discharging the pan straps therefrom, a bread catcher pivotally mounted for swinging movement below said bars to a position for catching said loaves and to a position for discharging the loaves, linkage interconnecting said bars and bread catcher, a pivotally mounted lever arm, means interconnecting the swinging end of said lever arm and said bread catcher, said lever arm having a longitudinal slot therein, a pivotally and rotatably mounted crank arm, the swinging end of said crank arm having means in sliding engagement in said slot, said crank arm on rotation thereof being operable for swinging said lever arm, said lever arm on swinging thereof being operable for swinging said bread catcher, and said bread catcher on swinging thereof being operable through said linkage for swinging said bars.

18. In a depanning machine, a shaft, a pair of bars pivoted on said shaft and swingable to a position for receiving pan straps adapted to contain bread loaves in inverted position whereby the loaves fall out of the pan straps, spring means biasing said bars to said position, said bars being swingable to a position for discharging the pan straps therefrom, an end plate pivotally mounted on said shaft adjacent one end thereof, means interconnecting the end plate and bars, a crank arm secured to said end plate, a cam follower on said end plate, a second shaft below said bars, a bread catcher pivotally mounted for swinging movement on said second shaft, said bread catcher being swingable upwardly to a position for receiving said loaves and swingable downwardly to a position for discharging said loaves, a crank arm secured to said bread catcher, a link pivotally secured to the swinging end of the second crank arm, the opposite end of said link having a slot therein, the swinging end of the first crank arm having means slidingly engaged in said slot, a cam mounted on and swingable with said bread catcher and engageable by said cam follower, a pivotally mounted lever arm, the swinging end of said lever arm being connected with said bread catcher, said lever arm having a slot therein, and an actuating crank arm having means on its swinging end slidingly engaging the slot in said lever arm, said actuating crank arm being operable when moved in one direction for swinging said lever arm and thereby swinging said bread catcher to discharging position, and the bread catcher thereby operating through said link for swinging said bars to discharging position, and the actuating crank arm when moved in the other direction swinging said lever arm and thereby the bread catcher to its first position, and said link being effective for permitting said bars to be moved to their first position under the influence of said spring means, and said cam and cam follower being operable for retarding the speed of swinging of said bars to their first position under the influence of said spring means.

References Cited in the file of this patent

UNITED STATES PATENTS

| Number | Name | Date |
|---|---|---|
| 456,336 | Paris | July 21, 1891 |
| 1,027,573 | Stebler | May 28, 1912 |
| 1,295,195 | Parker | Feb. 25, 1919 |
| 1,430,160 | Eggert | Sept. 26, 1922 |
| 1,557,776 | Russell | Oct. 20, 1925 |
| 1,561,664 | Rathwell | Nov. 17, 1925 |
| 1,903,835 | Olson | Apr. 18, 1933 |
| 1,955,427 | Keller | Apr. 17, 1934 |
| 2,036,863 | Dupuy | Apr. 7, 1936 |
| 2,254,550 | Stevenson | Sept. 2, 1941 |
| 2,271,937 | Engels | Feb. 3, 1942 |
| 2,344,664 | Adams | Mar. 21, 1944 |
| 2,462,021 | Harker | Feb. 15, 1949 |
| 2,524,656 | Eyster | Oct. 3, 1950 |
| 2,533,784 | Fruhling | Dec. 12, 1950 |
| 2,609,944 | Nicoletti | Sept. 9, 1952 |
| 2,633,258 | Temple et al. | Mar. 31, 1953 |
| 2,639,827 | Otte | May 26, 1953 |
| 2,639,828 | Otte | May 26, 1953 |

FOREIGN PATENTS

| Number | Country | Date |
|---|---|---|
| 253,111 | Italy | May 10, 1927 |